(12) United States Patent
Forstall et al.

(10) Patent No.: US 10,656,778 B2
(45) Date of Patent: May 19, 2020

(54) PORTABLE ELECTRONIC DEVICE, METHOD, AND GRAPHICAL USER INTERFACE FOR DISPLAYING STRUCTURED ELECTRONIC DOCUMENTS

(71) Applicant: Apple Inc., Cupertino, CA (US)

(72) Inventors: Scott Forstall, Los Altos, CA (US); Chris Blumenberg, San Francisco, CA (US); Andre M. J. Boule, San Jose, CA (US); Imran Chaudhri, San Francisco, CA (US); Gregory N. Christie, San Jose, CA (US); Stephen O. Lemay, Palo Alto, CA (US); Marcel Van Os, San Francisco, CA (US); Richard J. Williamson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/260,905

(22) Filed: Jan. 29, 2019

(65) Prior Publication Data
US 2019/0155458 A1    May 23, 2019

Related U.S. Application Data

(63) Continuation of application No. 15/619,027, filed on Jun. 9, 2017, now Pat. No. 10,228,815, which is a
(Continued)

(51) Int. Cl.
*G06F 3/0481* (2013.01)
*G06F 3/0484* (2013.01)
(Continued)

(52) U.S. Cl.
CPC .......... *G06F 3/0481* (2013.01); *G06F 3/0488* (2013.01); *G06F 3/04845* (2013.01); *G06F 3/04883* (2013.01); *H04M 1/72522* (2013.01)

(58) Field of Classification Search
CPC .. G06F 3/0481; G06F 3/04845; G06F 3/0488; G06F 3/04883; G06F 3/0484–04855; H04M 1/72522
(Continued)

(56) References Cited

U.S. PATENT DOCUMENTS 5,051,736 A    9/1991  Bennett et al.
5,347,295 A    9/1994  Agulnick et al.
(Continued)

FOREIGN PATENT DOCUMENTS

CN    1203679 A    12/1998
CN    1278340 A    12/2000
(Continued)

OTHER PUBLICATIONS

Final Office Action received for U.S. Appl. No. 11/961,773, dated May 1, 2019, 17 pages.
(Continued)

*Primary Examiner* — Stephen G Sherman
(74) *Attorney, Agent, or Firm* — Dentons US LLP

(57) ABSTRACT

At an electronic device with a touch screen display, display a user interface, where the user interface includes at least two windows of an application, a first icon displayed in association with a first window of the at least two windows, and a second icon at a location different from the at least two windows. While displaying the at least two windows, detect a gesture on the touch screen display. In response to detecting the gesture: in accordance with detecting the gesture on the first icon associated with the first window on the touch screen display, remove from the display the first window of the at least two displayed windows corresponding to the gesture; and in accordance with detecting the gesture on the second icon at the location different from the at least two
(Continued)

windows of the application, display a new window of the application on the touch screen display.

78 Claims, 29 Drawing Sheets

Related U.S. Application Data continuation of application No. 14/205,268, filed on Mar. 11, 2014, now Pat. No. 9,690,446, which is a continuation of application No. 12/981,433, filed on Dec. 29, 2010, now Pat. No. 8,669,950, which is a continuation of application No. 11/850,013, filed on Sep. 4, 2007, now Pat. No. 7,864,163.

(60) Provisional application No. 60/937,993, filed on Jun. 29, 2007, provisional application No. 60/946,715, filed on Jun. 27, 2007, provisional application No. 60/879,469, filed on Jan. 8, 2007, provisional application No. 60/879,253, filed on Jan. 7, 2007, provisional application No. 60/824,769, filed on Sep. 6, 2006.

(51) Int. Cl.
*G06F 3/0488* (2013.01)
*H04M 1/725* (2006.01)

(58) Field of Classification Search
USPC ......... 345/173–179; 178/18.01–18.09, 18.11
See application file for complete search history.

(56) References Cited

U.S. PATENT DOCUMENTS

| | | | |
|---|---|---|---|
| 5,404,458 A | 4/1995 | Zetts | |
| 5,559,301 A | 9/1996 | Bryan, Jr. et al. | |
| 5,610,653 A | 3/1997 | Abecassis | |
| 5,612,719 A | 3/1997 | Beernink et al. | |
| 5,739,821 A | 4/1998 | Ho et al. | |
| 5,760,773 A | 6/1998 | Berman et al. | |
| 5,828,370 A | 10/1998 | Demoney et al. | |
| 6,025,842 A | 2/2000 | Filetto et al. | |
| 6,040,824 A | 3/2000 | Maekawa et al. | |
| 6,069,606 A | 5/2000 | Sciammarella et al. | |
| 6,073,036 A | 6/2000 | Heikkinen et al. | |
| 6,133,916 A | 10/2000 | Bukszar et al. | |
| 6,177,936 B1 | 1/2001 | Cragun | |
| 6,199,082 B1 | 3/2001 | Ferrel et al. | |
| 6,243,080 B1 | 6/2001 | Molne | |
| 6,262,732 B1 | 7/2001 | Coleman et al. | |
| 6,285,374 B1 | 9/2001 | Falcon | |
| 6,297,795 B1 | 10/2001 | Kato et al. | |
| 6,313,855 B1 | 11/2001 | Shuping et al. | |
| 6,326,970 B1 | 12/2001 | Mott et al. | |
| 6,349,410 B1 | 2/2002 | Lortz | |
| 6,359,615 B1 | 3/2002 | Singh | |
| 6,411,283 B1 | 6/2002 | Murphy | |
| 6,466,198 B1 | 10/2002 | Feinstein | |
| 6,466,203 B2 | 10/2002 | Van Ee | |
| 6,486,895 B1 | 11/2002 | Robertson et al. | |
| 6,489,975 B1 | 12/2002 | Patil et al. | |
| 6,496,182 B1 | 12/2002 | Wong et al. | |
| 6,570,583 B1 | 5/2003 | Kung et al. | |
| 6,590,568 B1 | 7/2003 | Astala et al. | |
| 6,613,100 B2 | 9/2003 | Miller | |
| 6,639,584 B1 | 10/2003 | Li | |
| 6,643,824 B1 | 11/2003 | Bates et al. | |
| 6,683,628 B1 | 1/2004 | Nakagawa et al. | |
| 6,724,403 B1 | 4/2004 | Santoro et al. | |
| 6,771,250 B1 | 8/2004 | Oh | |
| 6,847,778 B1 | 1/2005 | Mckendrick et al. | |
| 6,928,461 B2 | 8/2005 | Tuli | |
| 6,956,564 B1 | 10/2005 | Williams | |
| 6,966,837 B1 | 11/2005 | Best | |
| 7,030,861 B1 | 4/2006 | Westerman et al. | |
| 7,054,965 B2 | 5/2006 | Bell et al. | |
| 7,075,512 B1 | 7/2006 | Fabre et al. | |
| 7,085,590 B2 | 8/2006 | Kennedy et al. | |
| 7,149,549 B1 | 12/2006 | Ortiz et al. | |
| 7,152,210 B1 | 12/2006 | Van Den Hoven et al. | |
| 7,166,791 B2 | 1/2007 | Robbin et al. | |
| 7,171,625 B1 | 1/2007 | Sacchi | |
| 7,346,855 B2 | 3/2008 | Hellyar et al. | |
| 7,446,783 B2 | 11/2008 | Grossman | |
| 7,461,353 B2 | 12/2008 | Rohrabaugh et al. | |
| 7,479,949 B2 | 1/2009 | Jobs et al. | |
| 7,480,870 B2 | 1/2009 | Anzures et al. | |
| 7,509,588 B2 | 3/2009 | Van Os et al. | |
| 7,587,671 B2 | 9/2009 | Saft et al. | |
| 7,596,761 B2 | 9/2009 | Lemay et al. | |
| 7,676,767 B2 | 3/2010 | Hofmeister et al. | |
| 7,730,401 B2 | 6/2010 | Gillespie et al. | |
| 7,739,271 B2 | 6/2010 | Cook et al. | |
| 7,788,583 B1 | 8/2010 | Amzallag et al. | |
| 7,831,926 B2 | 11/2010 | Rohrabaugh et al. | |
| 7,844,889 B2 | 11/2010 | Rohrabaugh et al. | |
| 7,864,163 B2 | 1/2011 | Ording et al. | |
| 7,889,185 B2 | 2/2011 | Blumenberg et al. | |
| 7,956,849 B2 | 6/2011 | Anzures et al. | |
| 8,214,768 B2 | 7/2012 | Boule et al. | |
| 8,531,423 B2 | 9/2013 | Anzures et al. | |
| 8,547,355 B2 | 10/2013 | Anzures et al. | |
| 8,669,950 B2 | 3/2014 | Forstall et al. | |
| 8,842,074 B2 | 9/2014 | Forstall et al. | |
| 8,912,988 B2 | 12/2014 | Tomida et al. | |
| 2001/0024195 A1 | 9/2001 | Hayakawa | |
| 2002/0015064 A1 | 2/2002 | Robotham et al. | |
| 2002/0033848 A1 | 3/2002 | Sciammarella et al. | |
| 2002/0093531 A1 | 7/2002 | Barile | |
| 2002/0152283 A1 | 10/2002 | Dutta et al. | |
| 2002/0163545 A1 | 11/2002 | Hii | |
| 2002/0191029 A1 | 12/2002 | Gillespie et al. | |
| 2003/0013483 A1 | 1/2003 | Ausems et al. | |
| 2003/0025676 A1 | 2/2003 | Cappendijk | |
| 2003/0033331 A1 | 2/2003 | Sena et al. | |
| 2003/0063125 A1 | 4/2003 | Miyajima et al. | |
| 2003/0076301 A1 | 4/2003 | Tsuk et al. | |
| 2003/0076303 A1 | 4/2003 | Huppi | |
| 2003/0081135 A1 | 5/2003 | Boll | |
| 2003/0095096 A1 | 5/2003 | Robbin et al. | |
| 2003/0095135 A1 | 5/2003 | Kaasila et al. | |
| 2003/0095155 A1 | 5/2003 | Johnson | |
| 2003/0117427 A1 | 6/2003 | Haughawout et al. | |
| 2003/0117440 A1 | 6/2003 | Hellyar et al. | |
| 2003/0135649 A1 | 7/2003 | Buckley et al. | |
| 2003/0164861 A1 | 9/2003 | Barbanson et al. | |
| 2003/0193524 A1 | 10/2003 | Bates et al. | |
| 2003/0204815 A1 | 10/2003 | Edwards et al. | |
| 2004/0049541 A1 | 3/2004 | Swahn et al. | |
| 2004/0085351 A1 | 5/2004 | Tokkonen | |
| 2004/0100479 A1 | 5/2004 | Nakano et al. | |
| 2004/0103371 A1 | 5/2004 | Chen et al. | |
| 2004/0125081 A1 | 7/2004 | Hayakawa | |
| 2004/0143796 A1 | 7/2004 | Lerner et al. | |
| 2004/0167783 A1 | 8/2004 | Nagai | |
| 2004/0169674 A1 | 9/2004 | Linjama | |
| 2004/0201595 A1 | 10/2004 | Manchester | |
| 2004/0205496 A1 | 10/2004 | Dutta et al. | |
| 2004/0215719 A1 | 10/2004 | Altshuler | |
| 2004/0223004 A1 | 11/2004 | Lincke et al. | |
| 2004/0268393 A1 | 12/2004 | Hunleth et al. | |
| 2004/0268400 A1 | 12/2004 | Barde et al. | |
| 2005/0005246 A1 | 1/2005 | Card et al. | |
| 2005/0012723 A1 | 1/2005 | Pallakoff | |
| 2005/0020317 A1 | 1/2005 | Koyama | |
| 2005/0044509 A1 | 2/2005 | Hunleth et al. | |
| 2005/0057524 A1 | 3/2005 | Hill et al. | |
| 2005/0066286 A1 | 3/2005 | Makela | |
| 2005/0071364 A1 | 3/2005 | Xie et al. | |
| 2005/0071736 A1 | 3/2005 | Schneider et al. | |
| 2005/0071778 A1 | 3/2005 | Tokkonen | |
| 2005/0079896 A1 | 4/2005 | Kokko et al. | |

(56) References Cited

U.S. PATENT DOCUMENTS

| | | |
|---|---|---|
| 2005/0091107 A1 | 4/2005 | Blum |
| 2005/0093826 A1 | 5/2005 | Huh |
| 2005/0097444 A1 | 5/2005 | Ivarsey et al. |
| 2005/0114788 A1 | 5/2005 | Fabritius |
| 2005/0166232 A1 | 7/2005 | Lamkin et al. |
| 2005/0177783 A1 | 8/2005 | Agrawala et al. |
| 2005/0183017 A1 | 8/2005 | Cain |
| 2005/0192924 A1 | 9/2005 | Drucker et al. |
| 2005/0204385 A1 | 9/2005 | Sull et al. |
| 2005/0229118 A1 | 10/2005 | Chiu et al. |
| 2005/0283739 A1 | 12/2005 | Mohr et al. |
| 2005/0285880 A1 | 12/2005 | Lai et al. |
| 2006/0001656 A1 | 1/2006 | LaViola et al. |
| 2006/0017692 A1 | 1/2006 | Wehrenberg et al. |
| 2006/0026521 A1 | 2/2006 | Hotelling et al. |
| 2006/0026535 A1 | 2/2006 | Hotelling et al. |
| 2006/0033761 A1 | 2/2006 | Suen et al. |
| 2006/0036944 A1 | 2/2006 | Wilson |
| 2006/0048076 A1 | 3/2006 | Vronay et al. |
| 2006/0053387 A1 | 3/2006 | Ording |
| 2006/0064647 A1 | 3/2006 | Tapuska et al. |
| 2006/0085743 A1 | 4/2006 | Baudisch et al. |
| 2006/0097991 A1 | 5/2006 | Hotelling et al. |
| 2006/0101354 A1 | 5/2006 | Hashimoto et al. |
| 2006/0123360 A1 | 6/2006 | Anwar et al. |
| 2006/0125799 A1 | 6/2006 | Hillis et al. |
| 2006/0143574 A1 | 6/2006 | Ito et al. |
| 2006/0146016 A1 | 7/2006 | Chan et al. |
| 2006/0146038 A1 | 7/2006 | Park et al. |
| 2006/0164382 A1 | 7/2006 | Kulas et al. |
| 2006/0176403 A1 | 8/2006 | Gritton et al. |
| 2006/0197753 A1 | 9/2006 | Hotelling |
| 2006/0262336 A1 | 11/2006 | Venkatachalam et al. |
| 2006/0265643 A1 | 11/2006 | Saft et al. |
| 2006/0267995 A1 | 11/2006 | Radloff et al. |
| 2006/0271858 A1 | 11/2006 | Yolleck et al. |
| 2006/0277588 A1 | 12/2006 | Harrington et al. |
| 2006/0284852 A1 | 12/2006 | Hofmeister et al. |
| 2007/0004451 A1 | 1/2007 | C. Anderson |
| 2007/0024646 A1 | 2/2007 | Saarinen et al. |
| 2007/0038612 A1 | 2/2007 | Sull et al. |
| 2007/0067738 A1 | 3/2007 | Flynt et al. |
| 2007/0106952 A1 | 5/2007 | Matas et al. |
| 2007/0152984 A1 | 7/2007 | Ording et al. |
| 2007/0155434 A1 | 7/2007 | Jobs et al. |
| 2007/0157228 A1 | 7/2007 | Bayer et al. |
| 2007/0250768 A1 | 10/2007 | Funakami et al. |
| 2007/0263176 A1 | 11/2007 | Nozaki et al. |
| 2008/0034029 A1 | 2/2008 | Fang et al. |
| 2008/0042984 A1 | 2/2008 | Lim et al. |
| 2008/0055272 A1 | 3/2008 | Anzures et al. |
| 2008/0062137 A1 | 3/2008 | Brodersen et al. |
| 2008/0122796 A1 | 5/2008 | Jobs et al. |
| 2008/0165148 A1 | 7/2008 | Williamson et al. |
| 2008/0165152 A1 | 7/2008 | Forstall et al. |
| 2008/0165153 A1 | 7/2008 | Platzer et al. |
| 2008/0174570 A1 | 7/2008 | Jobs et al. |
| 2008/0231610 A1 | 9/2008 | Hotelling et al. |
| 2014/0059434 A1 | 2/2014 | Anzures et al. |
| 2014/0092125 A1 | 4/2014 | Max et al. |
| 2015/0046849 A1 | 2/2015 | Forstall et al. |
| 2015/0082240 A1 | 3/2015 | Herz et al. |
| 2017/0269794 A1 | 9/2017 | Forstall et al. |
| 2018/0067643 A1 | 3/2018 | Ording et al. |

FOREIGN PATENT DOCUMENTS

| | | |
|---|---|---|
| CN | 1553367 A | 12/2004 |
| CN | 1577383 A | 2/2005 |
| CN | 1613105 A | 5/2005 |
| CN | 1658137 A | 8/2005 |
| CN | 1752979 A | 3/2006 |
| EP | 0476972 A2 | 3/1992 |
| EP | 0651544 A2 | 5/1995 |
| EP | 0701220 A1 | 3/1996 |
| EP | 0880090 A2 | 11/1998 |
| EP | 0990202 A1 | 4/2000 |
| EP | 1049305 A1 | 11/2000 |
| EP | 1255186 A2 | 11/2002 |
| EP | 1517228 A2 | 3/2005 |
| EP | 1564632 A2 | 8/2005 |
| EP | 1632874 A2 | 3/2006 |
| EP | 1640878 A1 | 3/2006 |
| EP | 1752880 A1 | 2/2007 |
| FR | 2830093 A3 | 3/2003 |
| GB | 2301217 A | 11/1996 |
| JP | 6-95794 A | 4/1994 |
| JP | 7-225829 A | 8/1995 |
| JP | 8-44253 A | 2/1996 |
| JP | 9-138745 A | 5/1997 |
| JP | 10-96648 A | 4/1998 |
| JP | 10-97543 A | 4/1998 |
| JP | 10-198517 A | 7/1998 |
| JP | 11-15817 A | 1/1999 |
| JP | 11-143604 A | 5/1999 |
| JP | 11-242539 A | 9/1999 |
| JP | 2000-56889 A | 2/2000 |
| JP | 2000-163444 A | 6/2000 |
| JP | 2000-181436 A | 6/2000 |
| JP | 2000-242390 A | 9/2000 |
| JP | 2001-14133 A | 1/2001 |
| JP | 2001-142604 A | 5/2001 |
| JP | 2001-175386 A | 6/2001 |
| JP | 2001-265481 A | 9/2001 |
| JP | 2001-516914 A | 10/2001 |
| JP | 2002-7476 A | 1/2002 |
| JP | 2002-244635 A | 8/2002 |
| JP | 2002-259001 A | 9/2002 |
| JP | 2002-323850 A | 11/2002 |
| JP | 2003-30121 A | 1/2003 |
| JP | 2003-512676 A | 4/2003 |
| JP | 2003-191392 A | 7/2003 |
| JP | 2003-195997 A | 7/2003 |
| JP | 2003-252808 A | 9/2003 |
| JP | 2003-263256 A | 9/2003 |
| JP | 2004-199696 A | 7/2004 |
| JP | 2004-206230 A | 7/2004 |
| JP | 2004-288208 A | 10/2004 |
| JP | 2004-318505 A | 11/2004 |
| JP | 2005-18229 A | 1/2005 |
| JP | 2005-18792 A | 1/2005 |
| JP | 2005-110286 A | 4/2005 |
| JP | 2005-234199 A | 9/2005 |
| JP | 2005-234291 A | 9/2005 |
| JP | 2005-242669 A | 9/2005 |
| JP | 2005-267049 A | 9/2005 |
| JP | 2006-18348 A | 1/2006 |
| JP | 2006-18645 A | 1/2006 |
| JP | 2006-120153 A | 5/2006 |
| JP | 2006-139669 A | 6/2006 |
| JP | 2008-508600 A | 3/2008 |
| JP | 2008-518330 A | 5/2008 |
| JP | 2013-222229 A | 10/2013 |
| JP | 2014-71514 A | 4/2014 |
| KR | 10-1998-0032331 A | 7/1998 |
| KR | 1020040095410 A | 11/2004 |
| KR | 10-2006-0031600 A | 4/2006 |
| KR | 10-2006-31600 A | 4/2006 |
| KR | 10-2006-91321 A | 8/2006 |
| KR | 10-2006-0091321 A | 8/2006 |
| WO | 97/20274 A1 | 6/1997 |
| WO | 99/14655 A1 | 3/1999 |
| WO | 99/54807 A1 | 10/1999 |
| WO | 00/8757 A1 | 2/2000 |
| WO | 02/46903 A1 | 6/2002 |
| WO | 02/82418 A2 | 10/2002 |
| WO | 02/93542 A1 | 11/2002 |
| WO | 03/52626 A1 | 6/2003 |
| WO | 2004/21166 A1 | 3/2004 |
| WO | 2004/23450 A1 | 3/2004 |
| WO | 2004/40481 A1 | 5/2004 |
| WO | 2005/29308 A2 | 3/2005 |
| WO | 2005/36416 A2 | 4/2005 |
| WO | 2005/41020 A1 | 5/2005 |

(56) References Cited

FOREIGN PATENT DOCUMENTS

| WO | 2005/74268 | A1 | 8/2005 |
|---|---|---|---|
| WO | 2005/106684 | A1 | 11/2005 |
| WO | 2006/3591 | A2 | 1/2006 |
| WO | 2006/20304 | A2 | 2/2006 |
| WO | 2006/20305 | A2 | 2/2006 |
| WO | 2006/42417 | A1 | 4/2006 |
| WO | 2006/47697 | A2 | 5/2006 |
| WO | 2007/89766 | A2 | 8/2007 |
| WO | 2008/30874 | A1 | 3/2008 |
| WO | 2008/030972 | A2 | 3/2008 |
| WO | 2008/30976 | A2 | 3/2008 |
| WO | 2008086303 | A1 | 7/2008 |

OTHER PUBLICATIONS

Notice of Acceptance received for Australian Patent Application No. 2017245373, dated May 1, 2019, 3 pages.
Decision to refuse received for European Patent Application No. 12169786.6, dated Mar. 7, 2019, 12 pages.
Minutes of Meetings received for European Patent Application No. 12169786.6, mailed on Mar. 5, 2019, 7 pages.
Notice of Allowance received for Japanese Patent Application No. 2014-238083, dated Mar. 12, 2019, 3 pages (1 page of English translation and 2 pages of Official copy).
"*Apple Inc.* vs. *Samsung Electronics Co. Ltd. et al.*, Judgment in Interlocutory proceeding, Case No. 396957/KG ZA 11-730, civil law sector", Aug. 24, 2011, pp. 1-65.
"*Apple Inc.* vs. *Samsung Electronics Co. Ltd., et al.*, Samsung's Motion to Supplement Invalidity Contentions, Case No. 11-cv-01846-LHK, filed Jan. 27, 2012 together with Exhibit 6", Jan. 27, 2012, 47 pages.
"*Apple Inc.* vs. *Samsung Electronics Co. Ltd., et al.*, Samsung's Patent Local Rule 3-3 and 3-4 Disclosures, Case No. 11-cv-01846-LHK, dated Oct. 7, 2011, together with Exhibits G-1 through G-7 and Exhibit H", Oct. 7, 2011, 287 pages.
Corrected Notice of Allowance received for U.S. Appl. No. 15/619,027, dated Nov. 6, 2018, 2 pages.
Decision to Grant received for European Patent Application No. 07814690.9, dated Nov. 10, 2016, 3 pages.
Decision to Grant received for European Patent Application No. 12174677.0, dated Sep. 29, 2016, 3 pages.
Examiner's Answer to Appeal Brief received for U.S. Appl. No. 14/043,788, mailed on Jun. 25, 2018, 25 pages.
Extended European Search Report received for European Patent Application No. 17171177.3, dated Feb. 6, 2018, 16 pages.
Final Office Action received for U.S. Appl. No. 14/043,788, dated Mar. 9, 2017, 14 pages.
Final Office Action received for U.S. Appl. No. 14/493,128, dated Dec. 21, 2016, 17 pages.
"HTC Europe Co. Ltd and Apple Inc. invalidity Claim dated Jul. 29, 2011, together with amended Particulars of Claim and amended Grounds of Invalidity", Jul. 29, 2011, 22 pages.
"HTC Europe Co. Ltd and Apple Inc. Invalidity Claim No. HC 12 C 01465, together with annexes, dated Apr. 5, 2012,", 12 pages.
Intention to Grant received for European Patent Application No. 07814690.9, dated Jun. 28, 2016, 7 pages.
Intention to Grant received for European Patent Application No. 12174677.0, dated May 6, 2016, 8 pages.
"Microsoft Word 2000 Microsoft Corporation", pp. MSWord Figures 1-5, 2000.
"Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA", Apr. 2012, 53 pages.
Non-Final Office Action received for U.S. Appl. No. 14/043,788, dated Jul. 14, 2016, 13 pages.
Non-Final Office Action received for U.S. Appl. No. 14/493,128, dated Sep. 12, 2016, 18 pages.

Non-Final Office Action received for U.S. Appl. No. 11/961,773, dated Apr. 2, 2018, 13 pages.
Non-Final Office Action received for U.S. Appl. No. 14/205,268, dated Sep. 26, 2016, 18 pages.
Non-Final Office Action received for U.S. Appl. No. 15/619,027, dated May 4, 2018, 15 pages.
Non-Final Office Action received for U.S. Appl. No. 15/807,283, dated Apr. 25, 2018, 12 pages.
Notice of Acceptance received for Australian Patent Application No. 2016204921, dated Jul. 10, 2017, 4 pages.
Notice of Allowance received for Canadian Patent Application No. 2,894,056, dated Jun. 4, 2018, 1 page.
Notice of Allowance received for Chinese Patent Application No. 201310136453.2, dated Jun. 26, 2017, 4 pages.
Notice of Allowance received for Chinese Patent Application No. 201310136787.X, dated Aug. 19, 2016, 4 pages.
Notice of Allowance received for Japanese Patent Application No. 2014-184473, dated Oct. 3, 2016, 3 pages.
Notice of Allowance received for Japanese Patent Application No. 2016-175843, dated Aug. 24, 2018, 4 pages.
Notice of Allowance received for Korean Patent Application No. 10-2014-7023012, dated May 24, 2016, 5 pages.
Notice of Allowance received for U.S. Appl. No. 14/205,268, dated Feb. 13, 2017, 8 pages.
Notice of Allowance received for U.S. Appl. No. 14/205,268, dated May 31, 2017, 5 Pages.
Notice of Allowance received for U.S. Appl. No. 14/493,128, dated Jun. 8, 2017, 7 pages.
Notice of Allowance received for U.S. Appl. No. 14/493,128, dated Nov. 8, 2017, 7 pages.
Notice of Allowance received for U.S. Appl. No. 15/619,027, dated Oct. 24, 2018, 10 pages.
Notice of Appeal in Expedited Appeal in Summary Proceedings dated Sep. 14, 2011, pp. 1-51.
Office Action issued in Korean Patent Application No. 10-2017-7037416, dated Feb. 20, 2018, 5 pages.
Office Action received for Australian Patent Application No. 2016204921, dated Mar. 24, 2017, 3 pages.
Office Action received for Australian Patent Application No. 2017245373, dated Aug. 29, 2018, 3 pages.
Office Action received for Canadian Patent Application No. 2,894,056, dated Jul. 4, 2016, 3 pages.
Office Action received for Canadian Patent Application No. 2,894,056, dated May 24, 2017, 3 Pages.
Office Action received for Canadian Patent Application No. 2,986,163 dated Sep. 20, 2018, 5 pages.
Office Action received for Chinese Patent Application No. 201310136453.2, dated Nov. 8, 2016, 11 pages.
Office Action received for European Patent Application No. 12169786.6 dated Jul. 17, 2017, 8 pages.
Office Action received for Japanese Patent Application No. 2014-238083, dated Feb. 24, 2017, 5 pages.
Office Action received for Japanese Patent Application No. 2014-238083, dated Feb. 26, 2016, 5 pages.
Office Action received for Japanese Patent Application No. 2014-238083, dated Jul. 20, 2018, 50 pages.
Office Action received for Japanese Patent Application No. 2014-238083, dated Sep. 5, 2017, 6 pages.
Office Action received for Japanese Patent Application No. 2016175843, dated Jul. 7, 2017, 8 pages.
Office Action received for Japanese Patent Application No. 2016-175843, dated May 11, 2018, 9 pages.
Office Action received for Korean Patent Application No. 10-2016-7023037, dated Aug. 28, 2017, 7 pages.
Office Action received for Korean Patent Application No. 1020167023037, dated Oct. 18, 2016, 13 pages.
Petition for Inter Partes Review of U.S. Pat. No. 7,864,163, pp. 1-225.
Pleading notes Mr B.J. Berghuis van Woortman, in matter of *Apple Inc.* vs *Samsung Electronics*, Case No. KG ZA 11-730 and KG ZA 11-731, Aug. 10-11, 2010, pp. 1-16.

(56) References Cited

OTHER PUBLICATIONS

Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
"*Samsung Electronics GmbH* vs *Apple Inc.*, "List scrolling and document translation, scaling and rotation on a touch-screen display", Opposition", Jan. 30, 2012, 27 pages.
"*Samsung Electronics* vs *Apple Inc.*, Statement of Defense Also Counterclaim, Case No. KG ZA 2011-730", Jul. 20, 2011, 44 pages.
"*Samsung Electronics* vs *Apple Inc.*, Statement of Defense Also Counterclaim, Case No. KG ZA 2011-731", Jul. 20, 2011, 48 pages.
Summons to Attend Oral Proceeding received for European Patent Application No. 12169786.6, mailed on Aug. 29, 2018, 9 pages.
Summons to Attend Oral Proceeding received for German Patent Application No. 112007002107.1, mailed on Jul. 11, 2018, 12 pages.
Summons to Oral Proceeding received for European Patent Application No. 12169786.6, mailed on Dec. 12, 2016, 9 pages.
Decision to Refusal received from European Patent Application No. 07814690.9, dated Jun. 11, 2012, 13 pages.
Office Action received for European Patent Application No. 07814690.9, dated Jun. 21, 2010, 5 pages.
Office Action received for European Patent Application No. 07814690.9, dated Oct. 19, 2010, 8 pages.
Summons to Attend Oral Proceedings received for European Patent Application No. 07814690.9, mailed on Nov. 22, 2011, 4 pages.
Summons to Oral Proceedings received for European Patent Application No. 07814690.9 issued on Feb. 1, 2016, 12 pages.
Decision to Grant received for European Patent Application No. 07841980.1, dated Aug. 1, 2013, 3 pages.
Intention to Grant received for European Patent Application No. 07841980.1, dated Mar. 11, 2013, 10 pages.
Office Action received for European Patent Application No. 07841980.1, dated Feb. 23, 2012, 5 pages.
Summons to Attend Oral Proceedings received for European Patent Application No. 07841980.1, mailed on Sep. 28, 2012, 8 pages.
Decision to Refusal received for European Patent Application No. 07869929.5, dated Jun. 4, 2012, 8 pages.
Office Action received for European Patent Application No. 07869929.5, dated Dec. 27, 2010, 6 pages.
Summons to Attend Oral Proceedings received for European Patent Application No. 07869929.5, Dec. 13, 2011, 6 pages.
Summons to Attend Oral Proceedings received for European Patent Application No. 07869929.5, mailed on Jan. 23, 2012, 1 page.
Decision to Refusal received for European Patent Application No. 09171787.6, dated Dec. 14, 2011, 22 pages.
Extended European Search Report (includes Partial European Search Report and European Search Opinion) received for European Patent Application No. 09171787.6, dated Jan. 26, 2010, 6 pages.
Office Action received for European Patent Application No. 09171787.6, dated Jan. 11, 2011, 1 page.
Office Action received for European Patent Application No. 09171787.6, dated Jul. 12, 2011, 5 pages.
Summons to attend oral proceedings received for European Patent Application No. 09171787.6, mailed on Sep. 11, 2015, 2 pages.
Office Action received for European Patent Application No. 09700007.9, dated Nov. 26, 2010, 5 pages.
Grant of Patent received for Taiwan Patent Application No. 097100075, dated Apr. 11, 2013, 3 pages.
Office Action received for Taiwan Patent Application No. 097100075, dated Dec. 29, 2011, 5 pages.
Notice of Allowance received for Korean Patent Application No. 10-2009-7007064, dated Sep. 30, 2011, 2 pages.
Notice of Allowance received for Korean Patent Application No. 10-2009-7007067, dated Dec. 1, 2011, 2 pages.
Office Action received for Korean Patent Application No. 10-2009-7007067, dated Aug. 30, 2011, 2 pages.
Office Action received for Korean Patent Application No. 10-2009-7007067, dated Nov. 12, 2010, 3 pages.
Notice of Allowance received for Korean Patent Application No. 10-2011-7019633, dated May 18, 2012, 2 pages.
Notice of Allowance received for Korean Patent Application No. 10-2011-7026453, dated Apr. 10, 2015, 3 pages.
Office Action received for Korean Patent Application No. 10-2011-7026453, dated Apr. 26, 2013, 3 pages.
Office Action received for Korean Patent Application No. 10-2011-7026453, dated Feb. 17, 2014, 9 pages.
Notice of Allowance received for Korean Patent Application No. 10-2013-7028362, dated Aug. 24, 2015, 5 pages.
Office Action received for Korean Patent Application No. 10-2013-7028362, dated Dec. 16, 2014, 5 pages.
Office Action received for Korean Patent Application No. 10-2013-7028362, dated Feb. 17, 2014, 4 pages.
Office Action received for Korean Patent Application No. 10-2014-7023012, dated Dec. 1, 2014, 3 pages.
Office Action received for Korean Patent Application No. 10-2014-7023012, dated Jun. 30, 2015, 6 pages.
Final Office Action received for U.S. Appl. No. 11/620,647, dated Dec. 23, 2010, 21 pages.
Non-Final Office Action received for U.S. Appl. No. 11/620,647 dated Jun. 24, 2010, 19 pages.
Non-Final Office Action received for U.S. Appl. No. 11/620,647 dated Nov. 17, 2009, 20 pages.
Non-Final Office Action received for U.S. Appl. No. 11/620,647, dated Oct. 13, 2011, 23 pages.
Notice of Allowance received for U.S. Appl. No. 11/620,647 dated Mar. 2, 2012, 8 pages.
Final Office Action received for U.S. Appl. No. 11/850,008, dated Dec. 29, 2010, 14 pages.
Non-Final Office Action received for U.S. Appl. No. 11/850,008, dated Aug. 2, 2010, 14 pages.
Notice of Allowance received for U.S. Appl. No. 11/850,008, dated Mar. 11, 2011, 7 pages.
Non-Final Office Action received for U.S. Appl. No. 11/850,013, dated Jun. 11, 2010, 32 pages.
Notice of Allowance received for U.S. Appl. No. 11/850,013, dated Oct. 20, 2010, 20 pages.
Final Office Action received for U.S. Appl. No. 11/850,638, dated Feb. 8, 2011, 14 pages.
Final Office Action received for U.S. Appl. No. 11/850,638, dated May 15, 2012, 16 pages.
Final Office Action received for U.S. Appl. No. 11/850,638, dated Feb. 4, 2014, 23 pages.
Non-Final Office Action received for U.S. Appl. No. 11/850,638, dated Jan. 17, 2012, 15 pages.
Non-Final Office Action received for U.S. Appl. No. 11/850,638, dated Oct. 26, 2010, 17 pages.
Non-Final Office Action received for U.S. Appl. No. 11/850,638, dated Jun. 27, 2013, 16 pages.
Notice of Allowance received for U.S. Appl. No. 11/850,638, dated May 13, 2014, 5 pages.
Final Office Action received for U.S. Appl. No. 11/961,773, dated Nov. 2, 2011, 12 pages.
Final Office Action received for U.S. Appl. No. 11/961,773, dated Nov. 29, 2012, 15 pages.
Non-Final Office Action received for U.S. Appl. No. 11/961,773, dated Apr. 15, 2011, 21 pages.
Non-Final Office Action received for U.S. Appl. No. 11/961,773, dated May 10, 2012, 14 pages.
Final Office Action received for U.S. Appl. No. 11/968,067, dated May 13, 2011, 16 pages.
Non-Final Office Action received for U.S. Appl. No. 11/968,067, dated Oct. 15, 2010, 13 pages.
Office Action received for German Patent Application No. 112007002107.1, dated Jun. 7, 2010, 3 pages.
Office Action received for German Patent Application No. 112009000003.7, dated Aug. 10, 2010, 3 pages.
Final Office Action received for U.S. Appl. No. 12/042,299, dated Jul. 8, 2011, 8 pages.
Non-Final Office Action received for U.S. Appl. No. 12/042,299, dated Jan. 4, 2011, 9 pages.

(56) References Cited

OTHER PUBLICATIONS

Non-Final Office Action received for U.S. Appl. No. 12/981,433, dated Oct. 11, 2012, 29 pages.
Notice of Allowance received for U.S. Appl. No. 12/981,433, dated Feb. 3, 2014, 5 pages.
Notice of Allowance received for U.S. Appl. No. 12/981,433, dated Feb. 19, 2013, 5 pages.
Notice of Allowance received for U.S. Appl. No. 12/981,433, dated Sep. 27, 2013, 6 pages.
Decision to Refuse received for European Patent Application No. 12169786.6 , dated Feb. 26, 2015, 16 pages.
Extended European Search Report (includes Partial European Search Report and European Search Opinion) received for European Patent Application No. 12169786.6, dated Jul. 11, 2012, 10 pages.
Office Action received for European Patent Application No. 12169786.6, dated Aug. 28, 2013, Aug. 28, 2013, 5 pages.
Summons to Attend Oral Proceeding received for European Patent Application No. 12169786.6, mailed on Jul. 31, 2014, 3 pages.
Extended European Search Report received for European Patent Application No. 12174677.0, dated Aug. 10, 2012, 11 pages.
Office Action received for European Patent Application No. 12174677.0, dated Aug. 28, 2013, 3 pages.
Final Office Action received for U.S. Appl. No. 13/155,304 dated Feb. 7, 2013, 12 pages.
Non-Final Office Action received for U.S. Appl. No. 13/155,304, dated Sep. 5, 2012, 11 pages.
Notice of Allowance received for U.S. Appl. No. 13/155,304, dated Jul. 25, 2013, 10 pages.
Non-Final Office Action received for U.S. Appl. No. 13/464,454, dated Jul. 9, 2012, 13 pages.
Notice of Allowance received for U.S. Appl. No. 13/464,454, dated May 1, 2013, 6 pages.
Notice of Allowance received for U.S. Appl. No. 13/464,454, dated Oct. 29, 2012, 5 pages.
Non-Final Office Action received for U.S. Appl. No. 14/043,788, dated Dec. 17, 2015, 13 pages.
Non Final Office Action received for U.S. Appl. No. 14/205,268, dated Feb. 18, 2016, 17 pages.
Notice of Allowance received for Canadian Patent Application No. 2,662,134, dated Dec. 10, 2014, 1 page.
Office Action received for Australian Patent Application No. 2007289019, dated Jul. 2, 2009, 3 pages.
Office Action received for Australian Patent Application No. 2007289019, dated Oct. 7, 2009, 2 pages.
Notice of Acceptance received for Australian Patent Application No. 2007292383, dated Jan. 4, 2012, 3 pages.
Office Action received for Australian Patent Application No. 2007292383, dated Dec. 22, 2011, 2 pages.
Office Action received for Australian Patent Application No. 2007292383, dated Mar. 24, 2010, 2 pages.
Office Action received for Australian Patent Application No. 2007292383, dated May 12, 2011, 2 pages.
Decision to Grant received for Chinese Patent Application No. 200780001140.9, dated Feb. 3, 2012, 4 pages.
Office Action received for Chinese Patent Application No. 200780001140.9, dated Jan. 15, 2010, 5 pages.
Office Action received for Chinese Patent Application No. 200780001140.9, dated Jun. 10, 2011, 7 pages.
Notice of allowance received for Chinese Patent Application No. 200780041222.6, dated Feb. 4, 2013, 2 pages.
Office Action received for Chinese Patent Application No. 200780041222.6, dated Feb. 29, 2012, 6 pages.
Office Action received for Chinese Patent Application No. 200780041222.6, dated Jul. 25, 2012, 3 pages.
Office Action received for Chinese Patent Application No. 200780041222.6, dated Oct. 13, 2010, 10 pages.
Notice of Allowance received for Chinese Patent Application No. 200780052019.9, dated Mar. 19, 2014, 4 pages.
Office Action received for Chinese Patent Application No. 200780052019, dated Jan. 22, 2013, 15 pages.
Office Action received for Chinese Patent Application No. 200780052019.9, dated Feb. 29, 2012, 6 pages.
Office Action received for Chinese Patent Application No. 200780052019.9, dated Jul. 30, 2013, 8 pages.
Office Action received for Australian Patent Application No. 2009100760, dated Sep. 28, 2009, 2 pages.
Office Action received for Chinese Patent Application No. 200910175852.3, dated Apr. 24, 2012, 10 pages.
Office Action received for Chinese Patent Application No. 200910175852.3, dated Jun. 3, 2014, 4 pages.
Office Action received for Chinese Patent Application No. 200910175852.3, dated Jun. 2, 2011, 6 pages.
Office Action received for Japanese Patent Application No. 2009-527541, dated Dec. 7, 2012, 10 pages.
Office Action received for Japanese Patent Application No. 2009-527541, dated May 21, 2012, 3 pages.
Office Action received for Japanese Patent Application No. 2009-527541, dated Sep. 26, 2011, 3 pages.
Notice of Allowance received for Japanese Patent Application No. 2009-527566, dated Oct. 4, 2013, 3 pages.
Office Action received for Japanese Patent Application No. 2009-527566, dated Aug. 15, 2011, 3 pages.
Office Action received for Japanese Patent Application No. 2009-527566, dated Sep. 21, 2012, 3 pages.
Certificate of Examination received for Australian Patent Application No. 2011101190, dated Nov. 23, 2011, 1 page.
Notice of Acceptance received for Australian Patent Application No. 2011265564, dated Aug. 4, 2014, 2 pages.
Office Action received for Australian Patent Application No. 2011265564, dated Jun. 14, 2013, 4 pages.
Notice of Allowance received for Chinese Patent Application No. 201210114287.1, dated Mar. 27, 2015, 4 pages.
Office Action received for Chinese Patent Application No. 201210114287.1, dated Jan. 8, 2014, 13 pages.
Office Action received for Chinese Patent Application No. 201210114287.1, dated Sep. 12, 2014, 9 pages.
Notice of Allowance received for Japanese Patent Application No. 2013-080820, dated Aug. 11, 2014, 3 pages.
Office Action received for Japanese Patent Application No. 2013-080820, dated Feb. 7, 2014, 7 pages.
Office Action received for Chinese Patent Application No. 201310136453.2, dated Apr. 21, 2015, 12 pages.
Office Action received for Chinese Patent Application No. 201310136453.2, dated Feb. 14, 2016, 28 pages.
Office Action Received for Chinese Patent Application No. 201310136787.X, dated Jan. 13, 2016, 28 pages.
Office Action received for Chinese Patent Application No. 201310136787.X, dated Jun. 1, 2015, 19 pages.
Notice of Allowance received for Japanese Patent Application No. 2013-229756, dated Oct. 24, 2014, 3 pages.
Office Action received for Japanese Patent Application No. 2014-184473, dated May 9, 2016, 6 pages.
Office Action received for Japanese Patent Application No. 2014-184473, dated Oct. 5, 2015, 6 pages.
Notice of Acceptance received for Australian Patent Application No. 2014262258, dated Apr. 1, 2016, 2 pages.
Office Action received for Australian Patent Application No. 2014262258, dated Jul. 13, 2015, 4 pages.
Agarwal, Amit, "iTunesInlineVideo", Digital Inspiration—The Tech Guide, available online at <http://labnol.blogspot.com/2006_09_17_labnol_archive.html>, 2006, 27 pages.
Ahmad et al., "Content-Based Image Retrieval on Mobile Devices", Proceedings of SPIE-IS&T Electronic Imaging, vol. 5684, 2005, pp. 255-264.
Alam et al., "Web Document Manipulation for Small Screen Devices: A Review", BCL Technologies Inc., Proceedings of the 2nd International Workshop on Web Document Analysis, 2003, pp. 33-36.
Alejandre, Suzanne, "Graphing Linear Equations", Available at <http://mathforum.org/alejandre/palm/times.palm.html>, retrieved on Jun. 12, 2006, 3 pages.
Apparao et al., "Level 1 Document Object Model Specification (Version 1.0)", W3C Working Draft, Available online at <http://www.w3.org/TR/WD-DOM/>, Jul. 20, 1998, 3 pages.

(56) References Cited

OTHER PUBLICATIONS

Arons, Barry M., "The Audio-Graphical Interface to a Personal Integrated Telecommunications System", Thesis Submitted to the Department of Architecture at the Massachusetts Institute of Technology, Jun. 1984, 88 pages.
Baudisch et al., "Collapse-to-Zoom: Viewing Web Pages on Small Screen Devices by Interactively Removing Irrelevant Content", Microsoft Research, Oct. 27, 2004, 4 pages.
Baudisch et al., "Halo: A Technique for Visualizing Off-Screen Locations", CHI 2003: New Horizons vol. No. 5, Apr. 5-10, 2003, pp. 481-488.
Bederson et al., "Pad++: A Zooming Graphical Interface for Exploring Alternate Interface Physics", UIST' 94 ACM, Nov. 2, 1994, pp. 17-26.
Bitstream®, "ThunderHawk Pocket PC Edition for End Users", Available at <http://www.bitstream.com/wireless/products/pocketpc/faq_using.html>, retrieved on Jun. 12, 2006, 4 pages.
Björk et al., "WEST: A Web Browser for Small Terminals", Proceedings of the 12th Annual ACM Symposium on User Interface Software and Technology, Nov. 7-10, 1999, 9 pages.
Bos et al., "3 Conformance: Requirements and Recommendations", Cascading Style Sheets, level 2 CSS2 Specification, W3C Recommendation, available at <http://www.w3.org/TR/CSS21/conform.html#doctree>, May 12, 1998, 6 pages.
Buyukkokten et al., "Power Browser: Efficient Web Browsing for PDAs", Proceedings of the SIGCHI conference on Human Factors in Computing Systems, 2000, 8 pages.
Chen et al., "A Novel Navigation and Transmission Technique for Mobile Handheld Devices", Technical Report CSE-2003-1, Department of Computer Science, University of California at Davis, 2003, 8 pages.
Chen et al., "Detecting Web Pages Structure for Adaptive Viewing on Small Form Factor Devices", Proceedings of the 12th international conference on World Wide Web, 2003, 9 pages.
Chen et al., "DRESS: A Slicing Tree Based Web Representation for Various Display Sizes", Microsoft Research, Technical Report, Nov. 16, 2002, 9 pages.
CNET, "Fujitsu LifeBook B6110D", Reviews, Nov. 24, 2005, 2 pages.
CNET, "Video: Create Custom Widgets with Web Clip", CNET News, Available at <http://news.cnet.com/1606-2-6103525.html>, Aug. 8, 2006, 3 pages.
Coleman, David W., "Meridian Mail Voice Mail System Integrates Voice Processing and Personal Computing", Speech Technology, vol. 4, No. 2, Mar./Apr. 1988, pp. 84-87.
Cooper, Alan, "The Inmates Are Running the Asylum", Sams Publishing, Mar. 23, 1999, pp. 138-147.
Eyemodule Springboard Compatible, "Turn Your Handspring™ Visor™ Handheld into a Digital Camera", User's Manual, 2000, 9 pages.
Fingerworks Forums, "Is the Multitouch Lemur?", Available at <http://64233.167.104/search?q=cache:sjVdtyFBvRMJ:forums.finger>, Dec. 24, 2004, 2 pages.
Fingerworks, Inc., "Installation and Operation Guide for iGesture Products w/Keys", available at <www.fingerworks.com>, © 2002, 10 pages.
Fingerworks, Inc., "Installation and Operation Guide for the TouchStream and TouchStream LP", available at <http://www.fingerworks.com>, 2002, pp. 1-25.
Fingerworks, Inc., "Quick Reference Guide for iGesture Products", available at <http://www.fingerworks.com>, 1999-2002, 2 pages.
Fingerworks, Inc., "Quick Reference Guide for TouchStream ST/LP", available at <http://www.fingerworks.com>, 2001-2003, 4 pages.
Fingerworks, Inc., "TouchStream LP Silver", available at <http://www.fingerworks.com>, Apr. 27, 2005, 18 pages.
Fling, Brian, "Designing for Mobile, Bringing Design Down to Size", Blue Flavor, Jul. 2006, 103 pages.
Gears, Leigh, "Orange SPV C600 Review", Available at <http://www.coolsmartphone.com/article569.html>, retrieved on Apr. 14, 2006, 57 pages.
Getgreg, "Jeff Han's Multiple Touch Point Display, the Stuff Dreams are Made of", Available at <http://www.theyshoulddothat.com/2006/08/jeff_hanns_multiple_touch_poin.html>, retrieved on Dec. 17, 2007, Aug. 16, 2006, 2 pages.
Guan et al., "Zoom Selector: A Pen-based Interaction Technique for Small Target Selection", Transactions of the Information Processing Society of Japan, vol. 45, No. 8, Aug. 2004, pp. 2087-2097.
Han, Jeff, "Talks Jeff Han: Unveiling the Genius of Multi-touch Interface Design", Ted Ideas Worth Spreading, available at <http://www.ted.com/index.php/talks/view/id/65> Retrieved on Dec. 17, 2007, Aug. 2006, 2 pages.
Hart, Kim, "Rewriting the Web for Mobile Phones", washingtonpost.com, available at <http://www.washingtonpost.com/wp-dyn/content/article/2006/07/25/AR2006072501517_pf.html>, Jul. 26, 2006, 2 pages.
Hinckley et al., "Input/Output Devices and Interaction Techniques", CRC Press, Nov. 2004, pp. 1-79.
Holmquist, Lars E., "The Zoom Browser Showing Simultaneous Detail and Overview in Large Documents", Available at<http://www.hb.se/bhs/ith/3-98/leh.htm> retrieved Dec. 17, 2007, Human IT; 1998, 12 pages.
Irani et al., "Improving Selection of Off-Screen Targets with Hopping", CHI 2006 Proceedings, Multidisplay Environments, Apr. 22-27, 2006, pp. 299-308.
Kamimori, Tsutomu, "Make the website more stylish! CSS Design Right Now Started", Web Creators, vol. 51, Mdn Corporation, Mar. 1, 2006, pp. 136-139.
Karlson et al., "AppLens and LaunchTile: Two Designs for One-Handed Thumb Use on Small Devices", Powerpoint Presentation, CHI 2005, pp. 1-17.
Karlson et al., "AppLens and LaunchTile: Two Designs for One-Handed Thumb Use on Small Devices", CHI 2005, Papers: Small Devices 1, Apr. 2-7, 2005, pp. 201-210.
Khella et al., "Pocket PhotoMesa: A Zoomable Image Browser for PDAs", Proceedings of the 3rd International Conference on Mobile and Ubiquitous Multimedia, available at <http://delivery.acm.org/10.1145/1060000/1052384/p19-khella.pdf?key1=1052384&key2=2419987911&coll=GUIDE&dl=GUIDE&CFID=47073625&CFTOKEN=65767142>, Oct. 29, 2004, 2 pages.
Kinoma, "Kinoma Player 4 EX Documentation", Available at <http://replay.waybackmachine.org/20061101175306/http://www.kinoma.com/index/pd-player-4>, Retrieved on Apr. 4, 2011, Nov. 1, 2006, 28 pages.
Laakko et al., "Adapting Web Content to Mobile User Agents", IEEE Internet Computing, vol. 9, No. 2, Mar./Apr. 2005, pp. 46-53.
Landragin, Frédéric, "The Role of Gesture in Multimodal Referring Actions", Proceedings of the 4th IEEE International Conference on Multimodal Interfaces, available at <http://ieeexplore.iee.org/ie15/8346/26309/01166988pdf?arnumber=1166988>, 2002, 6 pages.
Lie, Håkon W., "Cascading Style Sheets (chpt 8 CSS for small screens)", University of Osloensis, MDCCCXI, pp. 243-247, 2005, 8 pages.
Malak, Michael, "Adding Video to Your Web pages", Web Mechanics, Computing in Science and Engineering, May/Jun. 2000, pp. 74-77.
Marsh et al., "Using Cinematography Conventions to Inform Guidelines for the Design and Evaluation of Virtual Off-Screen Space", AAAI Technical Report SS-00-04, Jan. 1, 2000, 5 pages.
Microsoft Corporation, "Microsoft Office Word 2003 (SP2)", Microsoft Corporation, SP3 as of 2005, pp. MSWord 2003 Figures 1-5, 1983-2003.
Microsoft Word, "Example of Scrolling Pages in Word 2003", 2003, 3 pages.
Milic-Frayling et al., "SmartView: Enhanced Document Viewer for Mobile Devices", Microsoft Technical Report, Nov. 15, 2002, 10 pages.
Milic-Frayling et al., "SmartView: Flexible Viewing of Web Page Contents", Proceedings of the Eleventh International World Wide Web Conference, available at <http://www2002.org/CDROM/poster/172/>, May 11, 2002, 4 pages.
Myers, Brad A., "Shortcutter for Palm", available at <http://www.cs.cmu.edu/~pebbles/v5/shortcutter/palm/index.html>, retrieved on Jun. 18, 2014, 10 pages.

(56) References Cited

OTHER PUBLICATIONS

Northern Telecom, "Meridian Mail PC User Guide", 1988, 17 Pages.
Oliver, Dick, "Adding Multimedia to Your Web Site", Chapter 22, Web Publishing Professional Reference Edition, Available online at <http://www.ssuet.edu.pk/taimoor/books/1-57521-198-X/index.htm>, 1997, 14 pages.
Opera Software, "Download the Opera Mobile™ Browser", Available at <http://www.opera.com/products/mobile/products/>, retrieved on Oct. 19, 2006, 5 pages.
Opera Software, "Opera 7.60 for Series 60 Mobile", Available at <http://jp.opera.com/support/tutorials/s60/760/O760manual.pdf>, 2009, 14 pages.
Opera Software, "Opera 8.5 Beta 2 for Windows Mobile, Pocket PC", Available at <http://www.opera.com/products/mobile/products/winmobileppc>, retrieved on Apr. 5, 2006, 2 pages.
Opera Software, "Opera 8.5 for S60 Phones—Get the Full Internet Experience on Your Mobile Phone", Available at <http://www.symbian-freak.com/news/1105/opera.htm>, Oct. 14, 2005, 3 pages.
Opera Software, "Opera for Mobile, The Full Web Anytime, Anywhere", Available at <www.opera.com/mobile>, Jan. 2006, 7 pages.
Opera Software, "Opera for S60 Tutorial", Available at <http://www.xmarks.com/site/www.opera.com/support/tutorials/s60/>, retrieved on Apr. 5, 2006, 5 pages.
Opera Software, "Opera for Windows Mobile Smartphone 2003 Tutorial", Available at <http://www.opera.com/support/tutorials/winmobile>, retrieved on Apr. 5, 2005, 4 pages.
Opera Software, "The New Opera Browser for Series 60 Features Zoom and Password Manager", Press Releases Database, Available at <http://pressreleases.techwhack.com/1334/1411-opera-browser-features-zoom-and-password>, Nov. 14, 2005, 3 pages.
Palme et al., "MIME Encapsulation of Aggregate Documents, such as HTML", Network Working Group, 1999, 24 pages.
Palmone, "Your Mobile Manager", Chapter 2, LifeDrive™ User's Guide, available at <http://www.palm.com/us/support/handbooks/lifedrive/en/lifedrive_handbook.pdf>, 2005, 23 pages.
International Preliminary Report on Patentability received for PCT Patent Application No. PCT/US2007/077638 dated Mar. 10, 2009, 7 pages.
International Search Report and Written Opinion received for PCT Patent Application No. PCT/US2007/077638, dated Feb. 19, 2008, 9 pages.
International Preliminary Report on Patentability received for PCT Patent Application No. PCT/US2007/077644, dated Mar. 10, 2009, 11 pages.
International Search Report and Written Opinion received for PCT Patent Application No. PCT/US2007/077644, dated May 30, 2008, 18 pages.
Invitation to pay additional fees received for PCT Patent Application No. PCT/US2007/077644, dated Jan. 23, 2008, 10 pages.
International Preliminary Report on Patentability received for PCT Patent Application No. PCT/US2007/077773, dated Mar. 10, 2009, 6 pages.
International Search Report and Written Opinion received for PCT Patent Application No. PCT/US2007/077773, dated Jan. 15, 2008, 8 pages.
International Preliminary Report on Patentability received for PCT Patent Application No. PCT/US2007/088879, dated Jul. 7, 2009, 7 pages.
International Search Report and Written Opinion received for PCT Patent Application No. PCT/US2007/088879, dated Jun. 30, 2008, 8 pages.
International Preliminary Report on Patentability received for PCT Patent Application No. PCT/US2007/088893, dated Jul. 7, 2009, 8 pages.
International Search Report and Written Opinion received for PCT Patent Application No. PCT/US2007/088893, dated Jul. 11, 2008, 10 pages.
International Search Report and Written Opinion received for PCT Patent Application No. PCT/US2008/050430, Sep. 1, 2008, 13 pages.
Invitation to Pay Additional Fees Received for PCT Patent Application No. PCT/US2008/050430, dated Jun. 27, 2008, 7 pages.
International Search Report and Written Opinion received for PCT Patent Application No. PCT/US2010/062307, dated Apr. 5, 2011, 13 pages.
Perlin, Ken et al., "Pad: An Alternative Approach to the Computer Interface", Courant Institute of Mathematical Sciences, 1993, pp. 57-64.
Raman et al., "Application-Specific Workload Shaping in Multimedia-Enabled Personal Mobile Devices", CODES+ISSS, Oct. 22-25, 2006, pp. 4-9.
Raman, T., "Eyes-Free User Interaction", Google Research Available at <http://emacspeak.sf.net/raman>, Feb. 9, 2009, 25 pages.
Robie, Jonathan, "What is the Document Object Model?", Texcel Research, available at <http://www.w3.org/TR-DOM/introduction.html>, 2006, 5 pages.
Rohrer, Tim, "Metaphors We Compute by: Bringing Magic into Interface Design", Available online at <http://www.uoregon.edu/-uophil/metaphor/gui4web.htm>, retrieved on Jun. 13, 2006, 7 pages.
Roto et al., "Minimap—A Web Page Visualization Method for Mobile Phones", Proceedings of the SIGCHI Conference on Human Factors in Computing Systems, Apr. 22-27, 2006, pp. 35-44.
Salmre, I., "Characteristics of Mobile Applications", Chapter 2, Salmre_02.fm, Dec. 20, 2004, pp. 19-36.
Schmandt et al., "A Conversational Telephone Messaging System", IEEE Transactions on Consumer Electronics, vol. CE-30, Aug. 1984, pp. xxi-xxiv.
Schmandt et al., "Phone Slave: A Graphical Telecommunications Interface", Proceedings of the SID, vol. 26, No. 1, 1985, 4 pages.
Schmandt et al., "Phone Slave: A Graphical Telecommunications Interface", Society for Information Display, International Symposium Digest of Technical Papers, Jun. 1984, 4 pages.
Schreiner, Tony, "High DPI in IE: Tip & Mystery Solved", Tony Schreiner's Blog, available at <http://blogs.msdn.com/tonyschr/archive/2004/05/05/126305.aspx>, May 2004, 2 pages.
Stampfli, Tracy, "Exploring Full-Screen Mode in Flash Player 9", Available online at <http://www.adobe.com/devnet/flashplayer/articles/full_screen_mode.html>, Nov. 14, 2006, 2 pages.
Stanek et al., "Video and Animation Plug-Ins", Chapter 9, Web Publishing Professional Reference Edition, available online at <http://www.ssuet.edu.pk/taimoor/books/1-57521-198-X/index.htm>, 1997, 18 pages.
Surfin' Safari, "Xul", Available online at <http://weblogs.mozillazine.org/hyatt.archives/2003_10.html>, Oct. 2003, 7 pages.
Tidwell, Jenifer, "Animated Transition", Designing Interfaces, Patterns for effective Interaction Design, First Edition, Nov. 2005, 4 pages.
Tidwell, Jenifer, "Designing Interfaces, Animated Transition", Archieved by Internet Wayback Machine, Available at <https://web.archive.org/web/20060205040223/http://designinginterfaces.com:80/Animated_Transition>, Retrieved on Mar. 20, 2018, 2005, 2 pages.
Versiontracker, "Photogather-7.2.6. Hi-res Image Viewer & Editor for Palm", Available online at <http://www.versiontracker.com/dyn/moreinfo/palm/4624>, retrieved on Jun. 12, 2006, 2006, 5 pages.
w3schools.com, "Playing Videos on the Web", Available online at <http://www.w3schools.com/media/media_browservideos.asp?out=print>, 2006, 3 pages.
w3schools.com, "Multimedia Video Formats", Available online at <http://www.w3sschools.com/media/media_videoformats.asp?output=print>, 2006, 2 pages.
w3schools.com, "Playing QuickTime Movies", Available online at <http://www.3schools.com/media/media_quicktime.asp?output=print>, 2006, 2 pages.
Warabino et al., "Video Transcoding Proxy for 3Gwireless Mobile Internet Access", IEEE Communications Magazine, vol. 38, No. 10, Oct. 2000, pp. 66-71.
Wave Technologies, International Inc., "Certified Internet Webmaster Foundations Study Guide", A Thomson Learning Company, CIWF-SGMN-0101A, copyright 1988-2000, 88 pages.

(56) References Cited

OTHER PUBLICATIONS

Weblogs, "An Overview of WebCore", Chapter 2, WebCore Documentation, available at <http:/lweblogs.mozillazine.org/hyatt/WebCore/chapter2.html>, 2006, 3 pages.
Weblogs, "Downloading and Building WebCore", Chapter 1, WebCore Documentation, available at <http://weblogs.mozillazine.org/hyatt/WebCore/chapter1.html>, 2006, 2 pages.
webmasterworld.com, "Page Zooming with IE-Hidden Feature!", Available at <http://www.webmasterworld.com/forum83/4179.htm>, Jul. 2004, 7 pages.
Wikipedia, "Comparison of Layout Engines", The free encyclopedia, available at <http://en.wikipedia.org/wiki/Comparison_of_layout_engines>, 2006, 3 pages.
Wikipedia, "History of YouTube", The Free Encyclopedia, available at <http://en.wikipedia.org/wiki/History_of_YouTube>, retrieved on Mar. 15, 2011, 4 pages.
Wikipedia, "KDE", The free encyclopedia, available at <http://en.wikipedia.org/wiki/KDE>, 2006, 9 pages.
Wikipedia, "KHTML", The free encyclopedia, available at <http://en.wikipedia.org/wiki/KHTML>, 2006, 3 pages.
Wikipedia, "List of Layout Engines", The Free Encyclopedia, available at <http://en.wikipedia.org/wiki/List_of_layout_engines>, 2006, 1 page.
Williams, Martyn, "LG's Cell Phone Can Pause Live TV", PC World, Oct. 11, 2005, 2 pages.
Wobbrock et al., "WebThumb: Interaction Techniques for Small-Screen Browsers", UIST'02, Paris France, Oct. 27-30, 2002, pp. 205-208.
Xiao et al., "Slicing*-Tree Based Web Page Transformation for Small Displays", International Conference on Information and Knowledge Management, Oct. 31-Nov. 5, 2005, 2 pages.
Xie et al., "Efficient Browsing of Web Search Results on Mobile Devices Based on Block Importance Model", Microsoft Research Asia, 2005, 10 pages.
Yin et al., "Using Link Analysis to Improve Layout on Mobile Devices", Proceedings of the 13th international conference on World Wide Web, May 17-22, 2004, pp. 338-344.
Youtube, "Broadcast Yourself", Available at <www.youtube.com>, Nov. 1, 2005, 2 pages.
Youtube, "Broadcasting Ourselves", The Official Youtube blog Available at <http://youtube-global.blogspot.in/2005_11_01_archive.html>, Nov. 15, 2005, 5 pages.
Zytronic, "Touchscreen User Manual Zytronic X-Y Controller (Serial and USB)", XP007916436, Nov. 17, 2006, pp. 1-51.
Advisory Action received for U.S. Appl. No. 11/961,773, dated May 1, 2013, 3 pages.
Final Office Action received for U.S. Appl. No. 11/620,646, dated May 21, 2010, 18 pages.
Non-Final Office Action received for U.S. Appl. No. 11/620,646, dated Dec. 24, 2009, 15 pages.
Notice of Allowance received for U.S. Appl. No. 11/620,646, dated Nov. 23, 2010, 8 pages.
Notice of Allowance received for Korean Patent Application No. 10-2017-7037416, dated Nov. 8, 2019, 5 pages (2 pages of English Translation and 3 pages of Official Copy).
Summons to Attend Oral Proceedings received for European Patent Application No. 17171177.3, mailed on Jul. 26, 2019, 6 pages.
Non-Final Office Action received for U.S. Appl. No. 11/961,773, dated Sep. 24, 2019, 16 pages.
Notice of Allowance received for Canadian Patent Application No. 2,986,163, dated Sep. 11, 2019, 1 page.
Notice of Allowance received for Japanese Patent Application No. 2018-178038, dated Sep. 30, 2019, 4 pages (1 page of English Translation and 3 pages of Official Copy).
Office Action received for European Patent Application No. 17171177.3, dated Sep. 18, 2019, 5 pages.
Decision on Appeal received for Korean Patent Application No. 10-2016-7023037, dated Jun. 17, 2019, 21 pages (2 pages of English Translation and 19 pages of Official Copy).

PORTABLE ELECTRONIC DEVICE, METHOD, AND GRAPHICAL USER INTERFACE FOR DISPLAYING STRUCTURED ELECTRONIC DOCUMENTS

RELATED APPLICATIONS

This application is a continuation of U.S. application Ser. No. 15/619,027, filed Jun. 9, 2017, entitled "Portable Electronic Device, Method, and Graphical User Interface for Displaying Structured Electronic Documents," which is a continuation of U.S. application Ser. No. 14/205,268, filed Mar. 11, 2014, now U.S. Pat. No. 9,690,446, entitled "Portable Electronic Device, Method, and Graphical User Interface for Displaying Structured Electronic Documents," which is a continuation of U.S. application Ser. No. 12/981,433, filed Dec. 29, 2010, now U.S. Pat. No. 8,669,950, entitled "Portable Electronic Device, Method, and Graphical User Interface for Displaying Structured Electronic Documents," which is a continuation of U.S. application Ser. No. 11/850,013, filed Sep. 4, 2007, now U.S. Pat. No. 7,864,163, entitled "Portable Electronic Device, Method, and Graphical User Interface for Displaying Structured Electronic Documents," which claims priority to U.S. Provisional Patent Application Nos. 60/937,993, entitled "Portable Multifunction Device," filed Jun. 29, 2007; 60/946,715, entitled "Portable Electronic Device, Method, And Graphical User Interface For Displaying Structured Electronic Documents," filed Jun. 27, 2007; 60/879,469, entitled "Portable Multifunction Device," filed Jan. 8, 2007; 60/879,253, entitled "Portable Multifunction Device," filed Jan. 7, 2007; and 60/824,769, entitled "Portable Multifunction Device," filed Sep. 6, 2006. All of these applications are incorporated by referenced herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Provisional Patent Application No. 60/947,155, "Portable Electronic Device, Method, And Graphical User Interface For Displaying Inline Multimedia Content", filed Jun. 29, 2007. All of these applications are incorporated by reference herein in their entirety.

TECHNICAL FIELD

The disclosed embodiments relate generally to portable electronic devices, and more particularly, to portable electronic devices that display structured electronic documents such as web pages on a touch screen display.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of push buttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

In particular, it is slow and tedious to navigate in structured electronic documents (e.g., web pages) in portable electronic devices with small screens using conventional input devices (e.g., 5-way toggle switches). Moreover, it is cumbersome to control and view multimedia content within such documents on portable electronic devices.

Accordingly, there is a need for portable electronic devices with more transparent and intuitive user interfaces for viewing and navigating structured electronic documents and multimedia content within such documents. Such interfaces increase the effectiveness, efficiency and user satisfaction with activities like web browsing on portable electronic devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In one aspect of the invention, a computer-implemented method, for use in conjunction with a portable electronic device with a touch screen display, comprises: displaying at least a portion of a structured electronic document on the touch screen display, wherein the structured electronic document comprises a plurality of boxes of content; detecting a first gesture at a location on the displayed portion of the structured electronic document; determining a first box in the plurality of boxes at the location of the first gesture; and enlarging and substantially centering the first box on the touch screen display.

In another aspect of the invention, a graphical user interface on a portable electronic device with a touch screen display comprises: at least a portion of a structured electronic document, wherein the structured electronic document comprises a plurality of boxes of content. In response to detecting a first gesture at a location on the portion of the structured electronic document, a first box in the plurality of boxes at the location of the first gesture is determined and the first box is enlarged and substantially centered on the touch screen display.

In another aspect of the invention, a portable electronic device comprises: a touch screen display, one or more processors, memory, and one or more programs. The one or more programs are stored in the memory and configured to be executed by the one or more processors. The one or more programs include instructions for displaying at least a portion of a structured electronic document on the touch screen display, wherein the structured electronic document comprises a plurality of boxes of content. The one or more programs also include instructions for detecting a first gesture at a location on the displayed portion of the structured electronic document; instructions for determining a first box in the plurality of boxes at the location of the first gesture; and instructions for enlarging and substantially centering the first box on the touch screen display.

In another aspect of the invention, a computer-program product comprises a computer readable storage medium and a computer program mechanism (e.g., one or more computer programs) embedded therein. The computer program mechanism comprises instructions, which when executed by a portable electronic device with a touch screen display, cause the device to display at least a portion of a structured electronic document on the touch screen display, wherein the structured electronic document comprises a plurality of boxes of content; to detect a first gesture at a location on the displayed portion of the structured electronic document; to determine a first box in the plurality of boxes at the location of the first gesture; and to enlarge and substantially center the first box on the touch screen display.

In another aspect of the invention, a portable electronic device with a touch screen display comprises means for displaying at least a portion of a structured electronic document on the touch screen display, wherein the structured electronic document comprises a plurality of boxes of content; means for detecting a first gesture at a location on the displayed portion of the structured electronic document; means for determining a first box in the plurality of boxes at the location of the first gesture; and means for enlarging and substantially centering the first box on the touch screen display.

The disclosed embodiments allow users to more easily view and navigate structured electronic documents and multimedia content within such documents on portable electronic devices.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
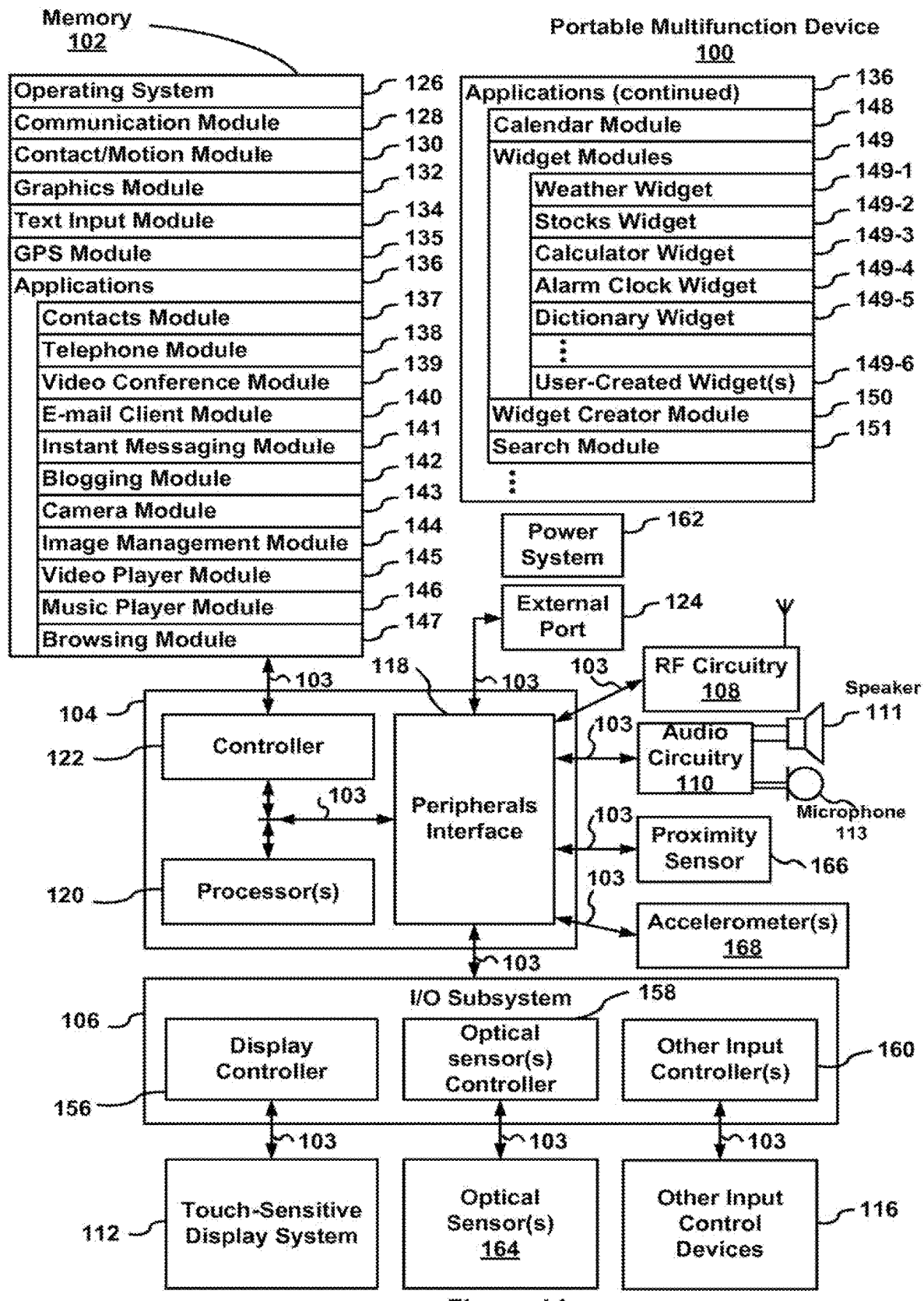
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
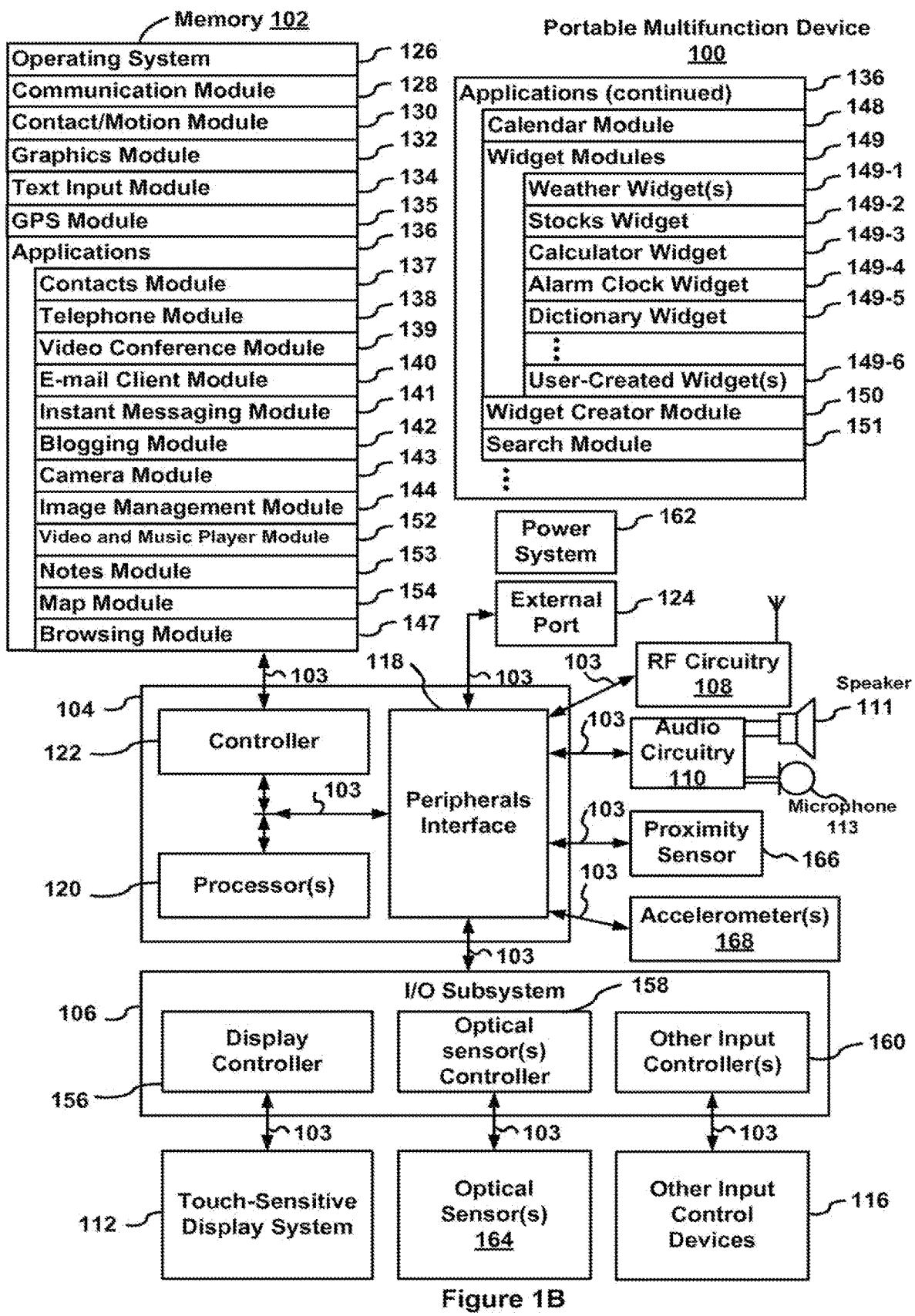

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the Hollowing U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 11/620,702, filed Jan. 7, 2007, "Using Ambient Light Sensor To Augment Proximity Sensor Output;" Ser. No. 11/586,862, filed Oct. 24, 2006, "Automated Response To And Sensing Of User Activity In Portable Devices;" and Ser. No. 11/638,251, filed Dec. 12, 2006, "Methods And Systems For Automatic Configuration Of Peripherals," which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which incorporated herein by reference. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153; and/or
- map module 154.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RP circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise rearranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
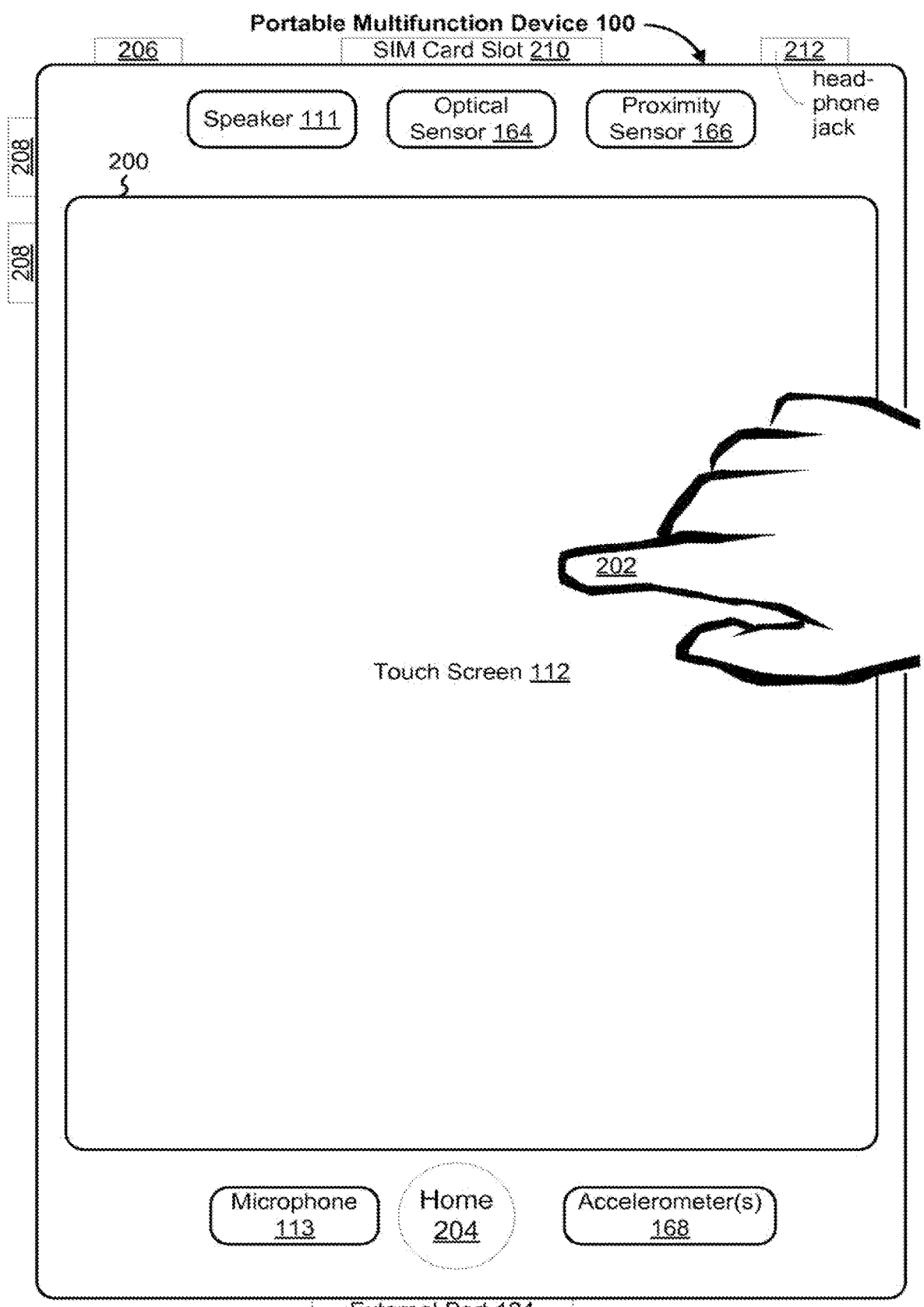
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
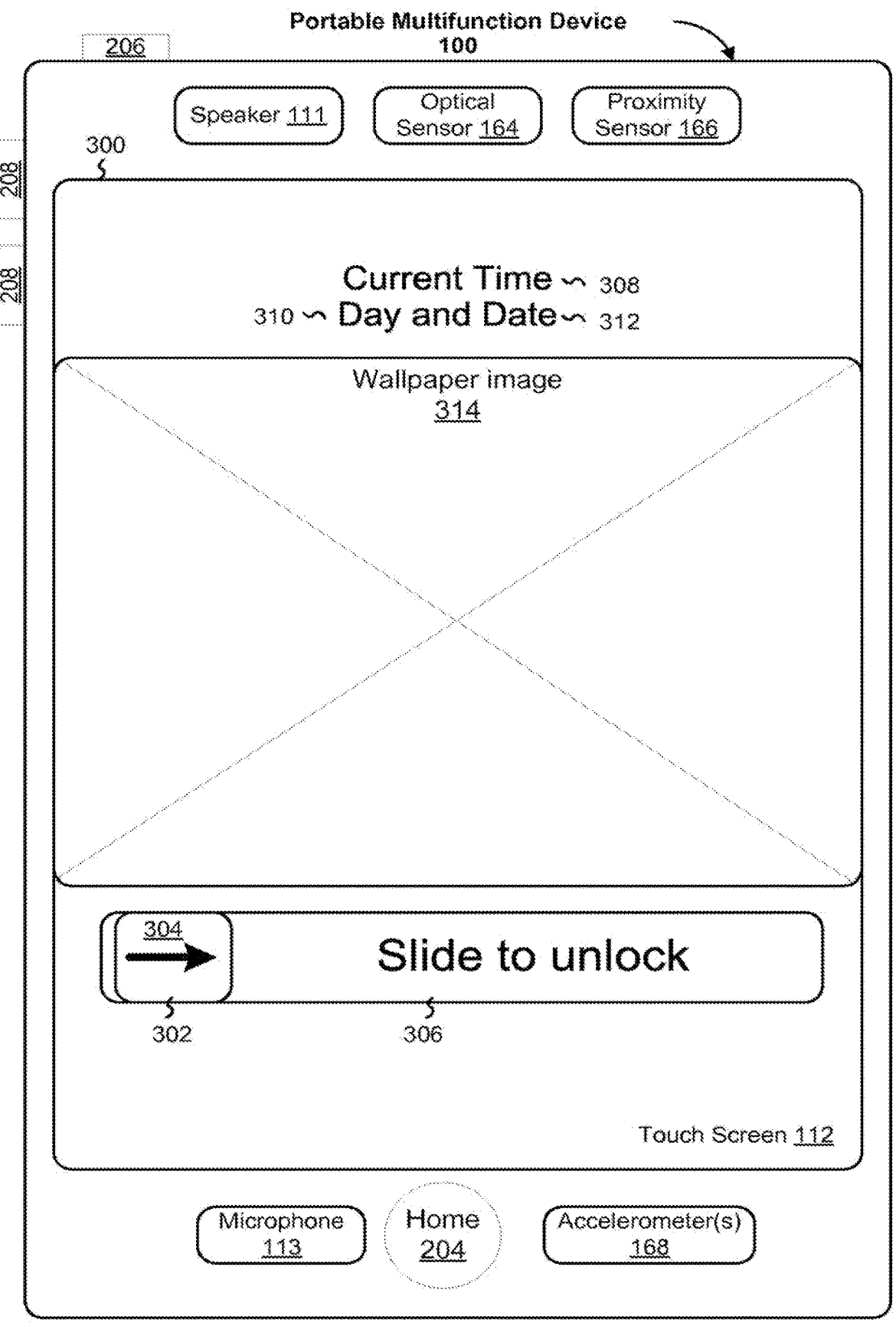
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
  Unlock image 302 that is moved with a finger gesture to unlock the device:
  Arrow 304 that provides a visual cue to the unlock gesture;
  Channel 306 that provides additional cues to the unlock gesture;
  Time 308;
  Day 310;
  Date 312; and
  Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference.

Figure 4A:
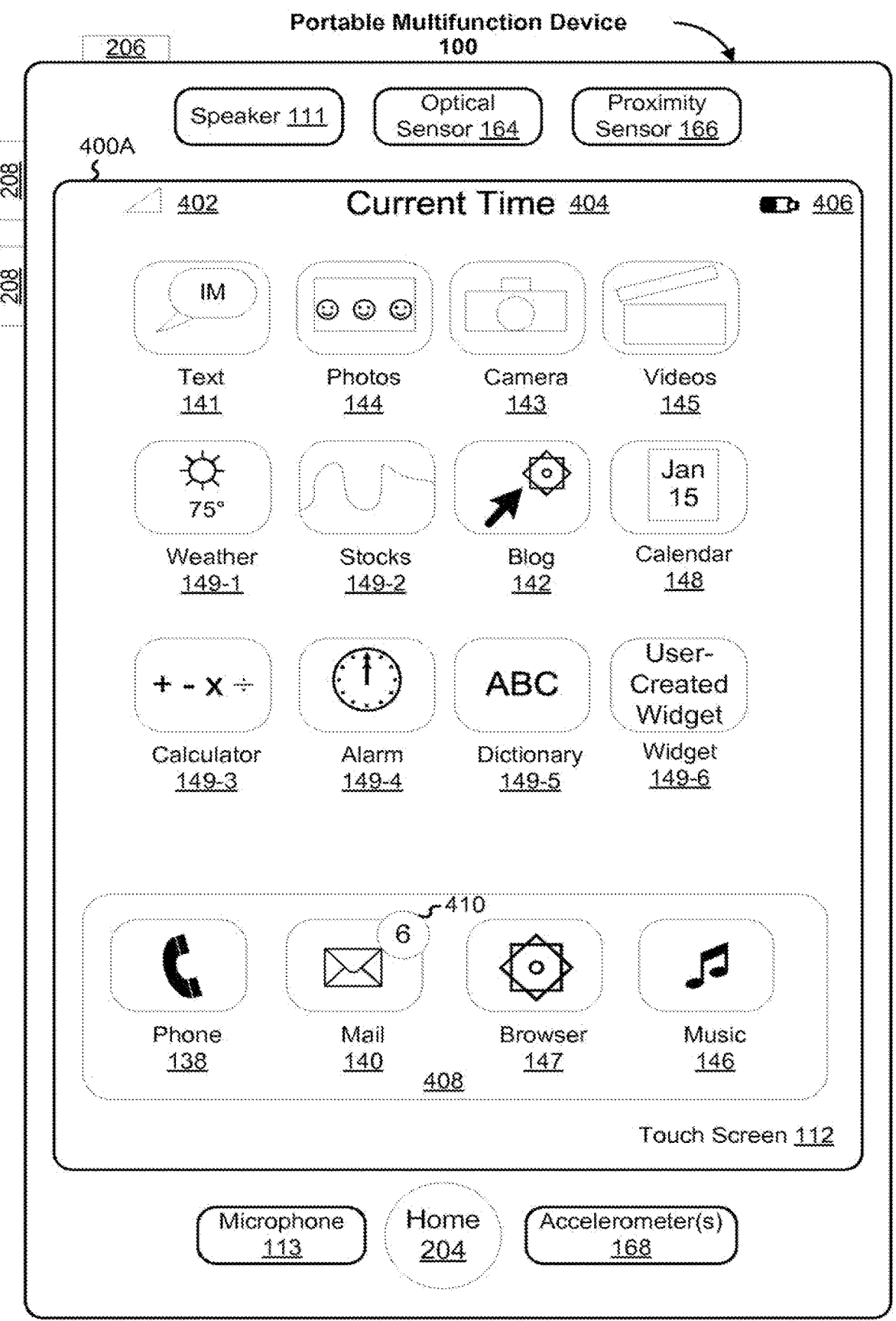
FIGS. 4A and 4B illustrate exemplary user interfaces for a menu of applications on a portable multifunction device in accordance with some embodiments.
Figure 4B:
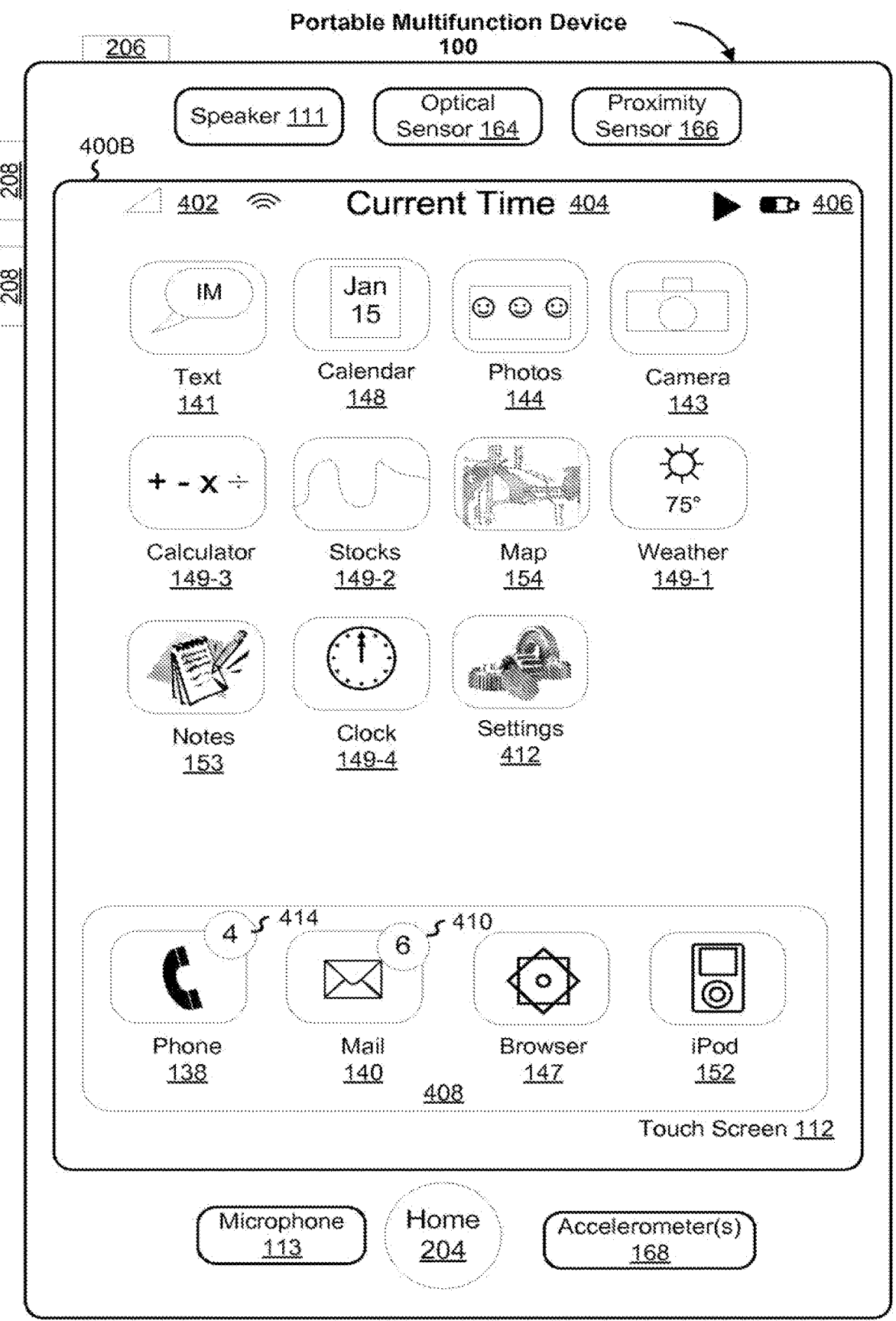

FIGS. 4A and 4B illustrate exemplary user interfaces for a menu of applications on a portable multifunction device in accordance with some embodiments. In some embodiments, user interface 400A includes the following elements, or a subset or superset thereof:
  Signal strength indicator(s) 402 for wireless communication(s), such as cellular and Wi-Fi signals;
  Time 404;
  Battery status indicator 406;
  Tray 408 with icons for frequently used applications, such as one or more of the following:
    Phone 138, which may include an indicator 414 of the number of missed calls or voicemail messages;
    E-mail client 140, which may include an indicator 410 of the number of unread e-mails;
    Browser 147; and
    Music player 146; and
  Icons for other applications, such as one or more of the following:
    IM 141;
    Image management 144;
    Camera 143;
    Video player 145;
    Weather 149-1;
    Stocks 149-2;
    Blog 142;
    Calendar 148;
    Calculator 149-3;
    Alarm clock 149-4;
    Dictionary 149-5; and
    User-created widget 149-6.

In some embodiments, user interface 400B includes the following elements, or a subset or superset thereof:
  402, 404, 406, 141, 148, 144, 143, 149-3, 149-2, 149-1, 149-4, 410, 414, 138, 140, and 147, as described above;
  Map 154;
  Notes 153;
  Settings 412, which provides access to settings for the device 100 and its various applications 136, as described further below; and
  Video and music player module 152, also referred to as iPod (trademark of Apple Computer, Inc.) module 152.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

FIGS. 5A-5M illustrate exemplary user interfaces for a browser in accordance with some embodiments.

Figure 5A:
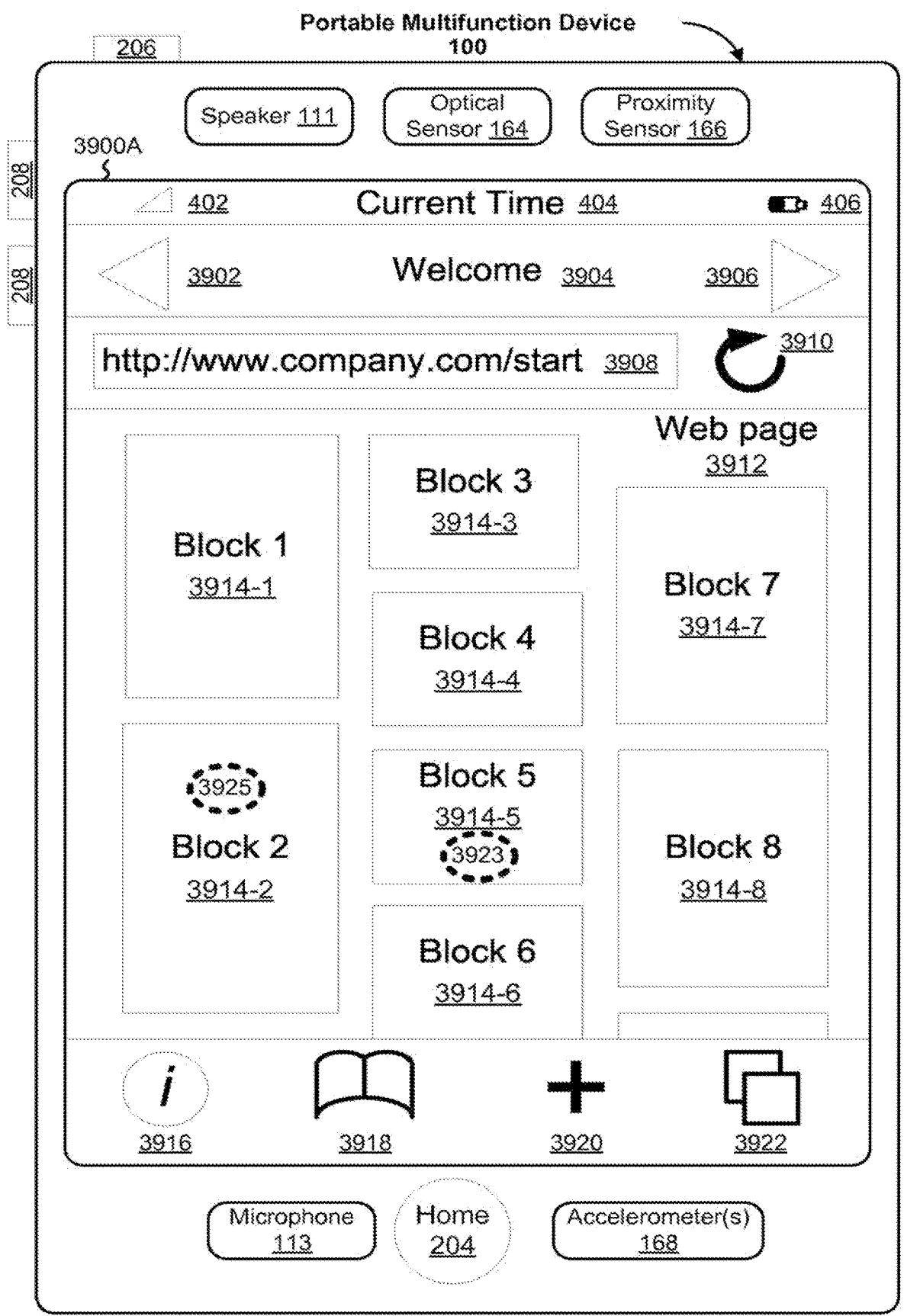
FIGS. 5A-5M illustrate exemplary user interfaces for a browser in accordance with some embodiments.
Figure 5B:
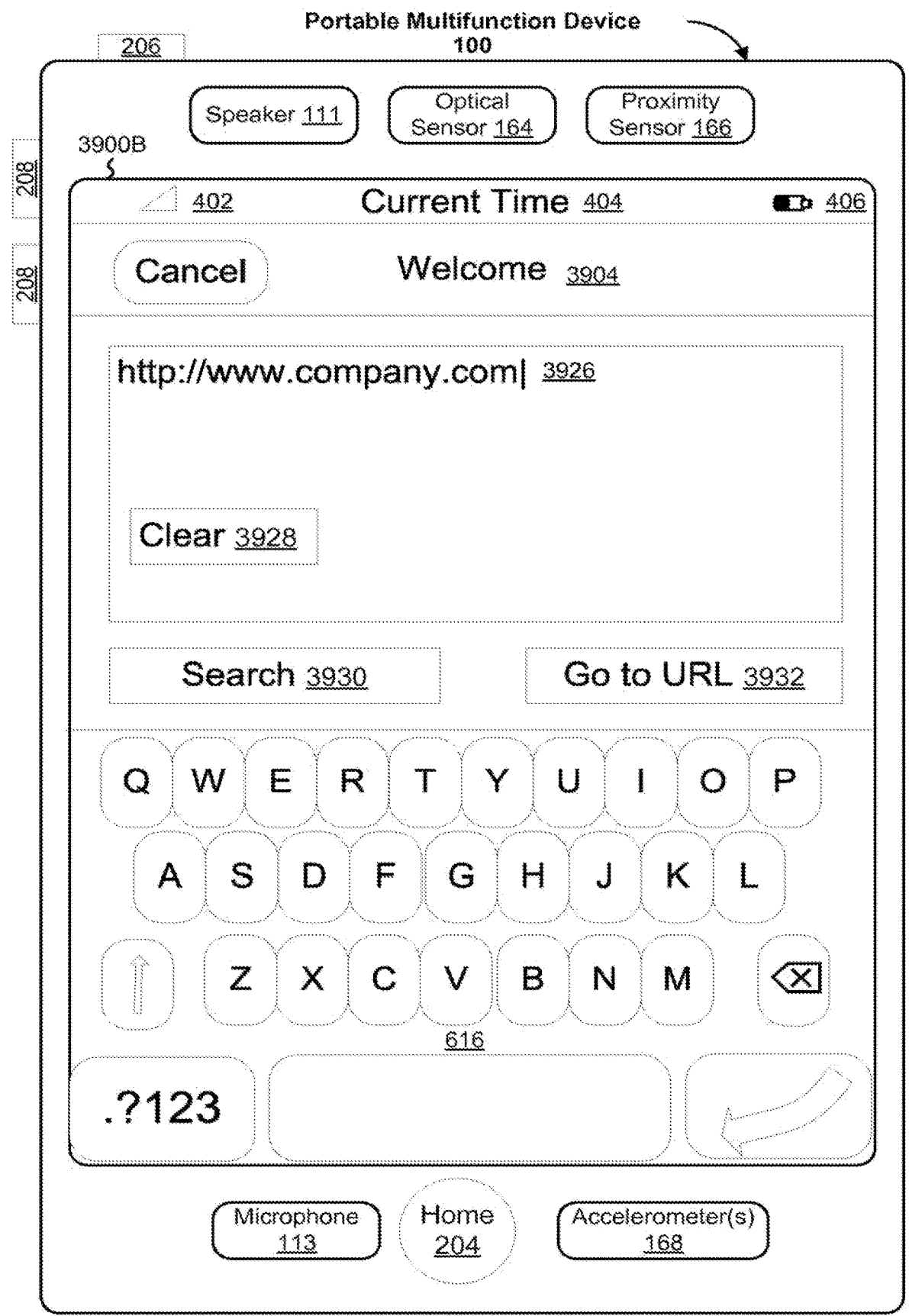
Figure 5C:
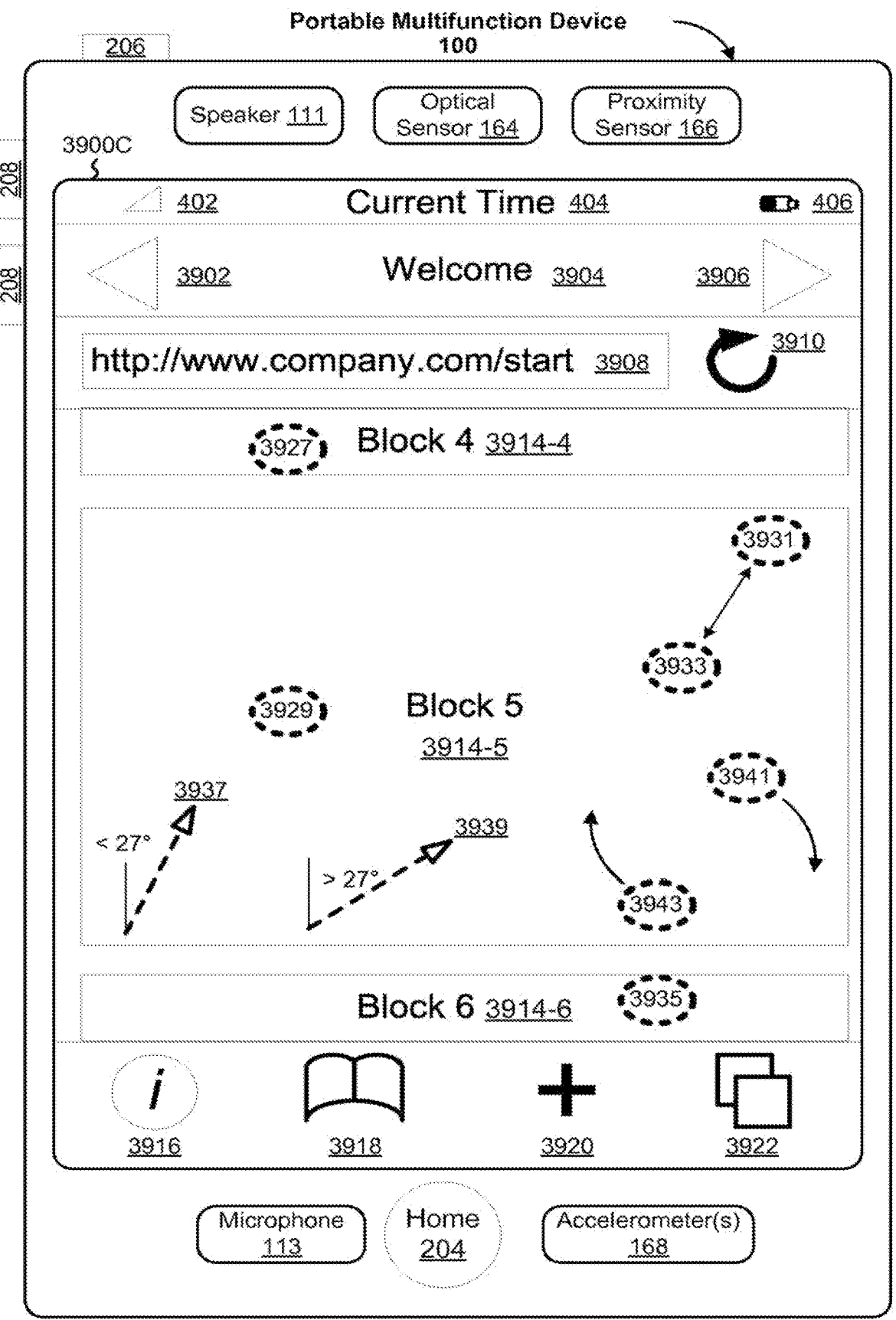
Figure 5D:
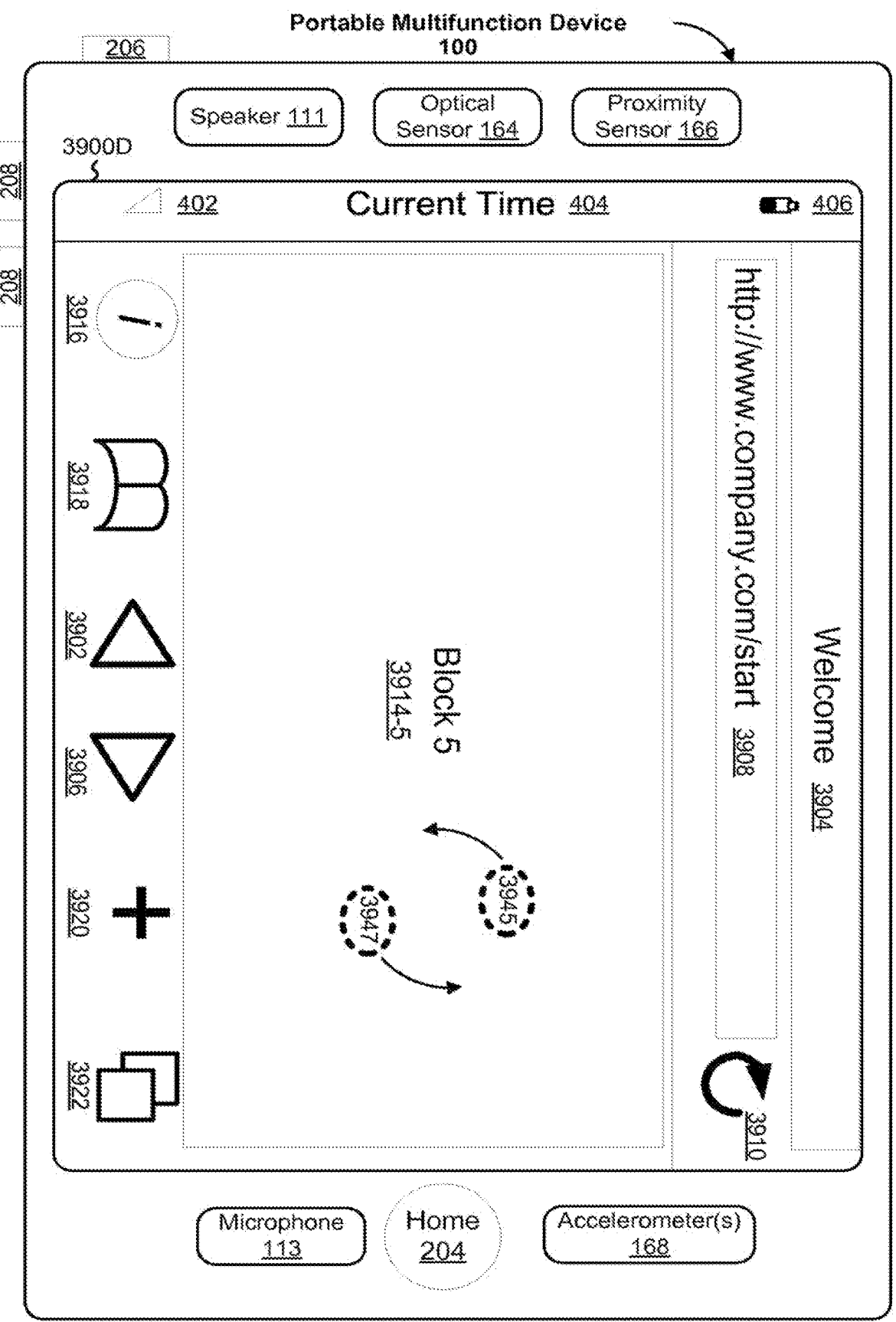
Figure 5E:
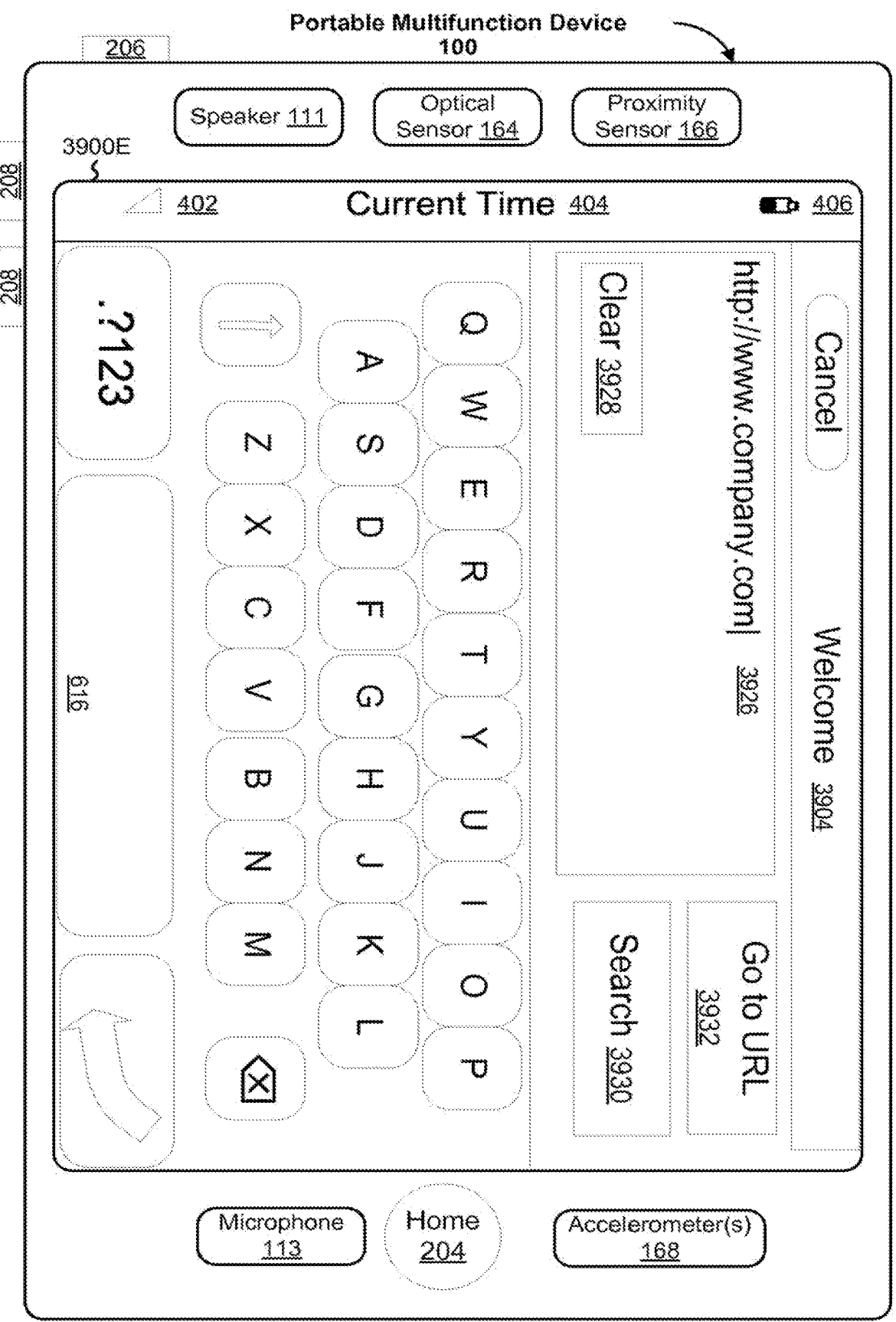
Figure 5F:
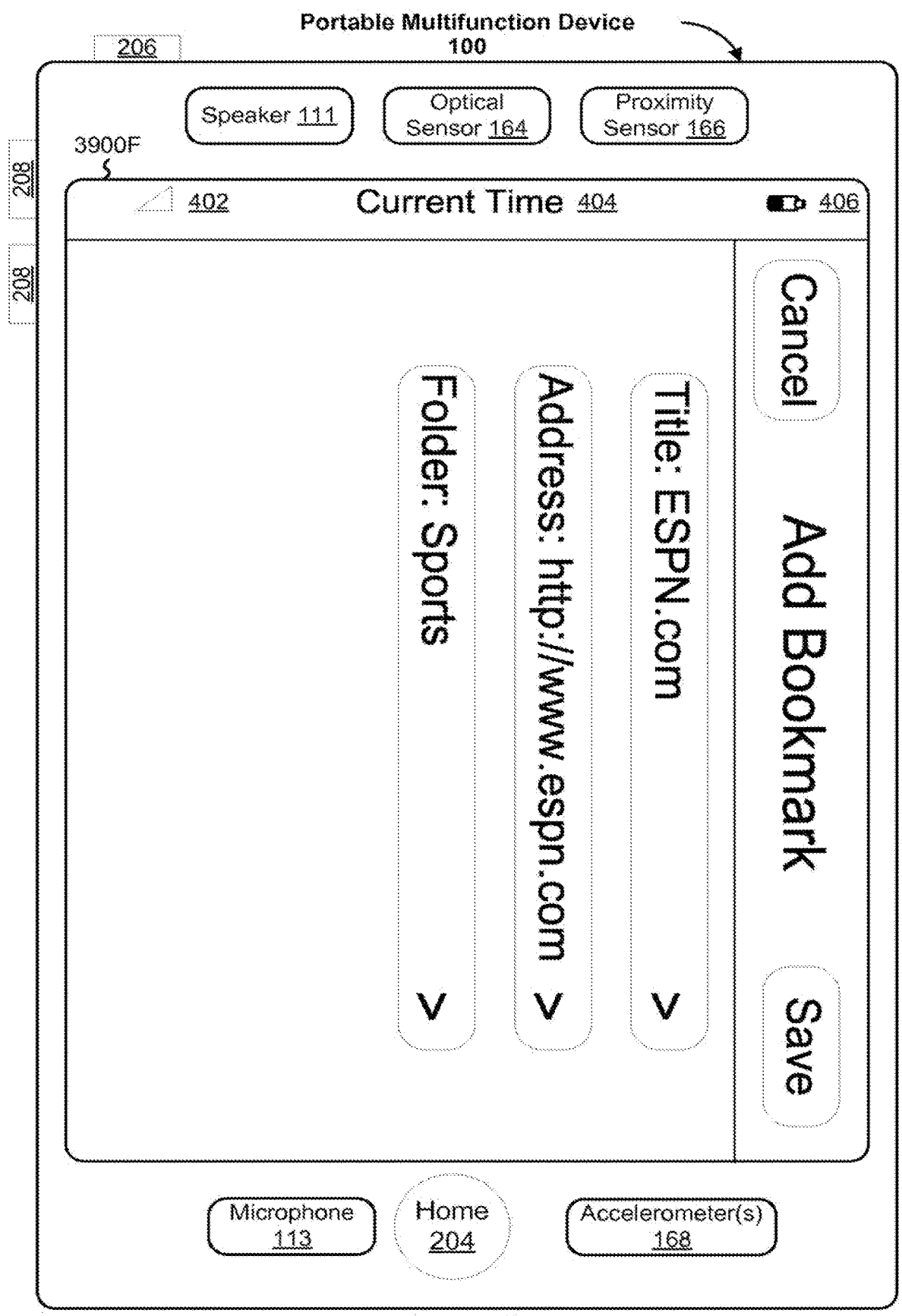
Figure 5G:
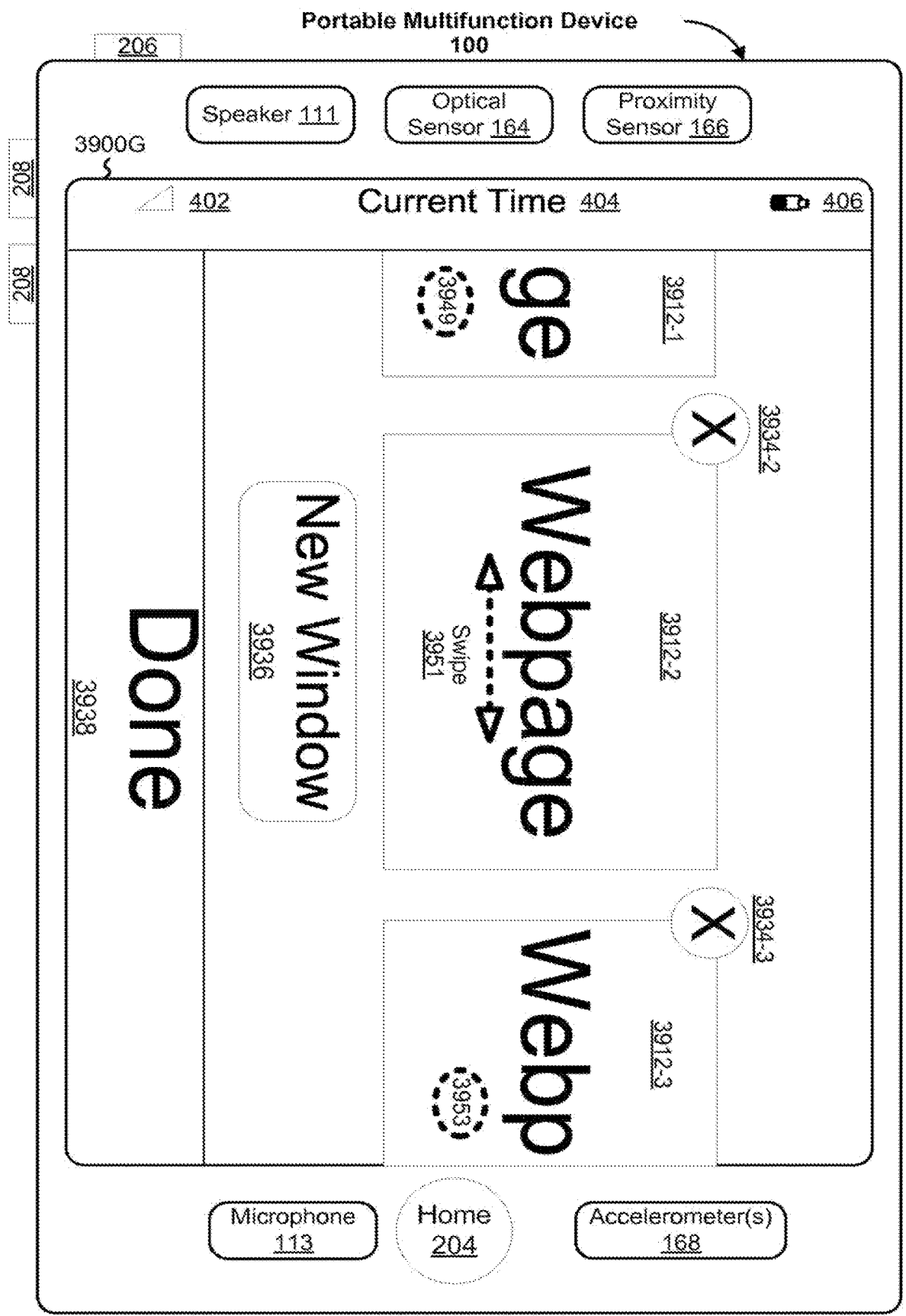
Figure 5H:
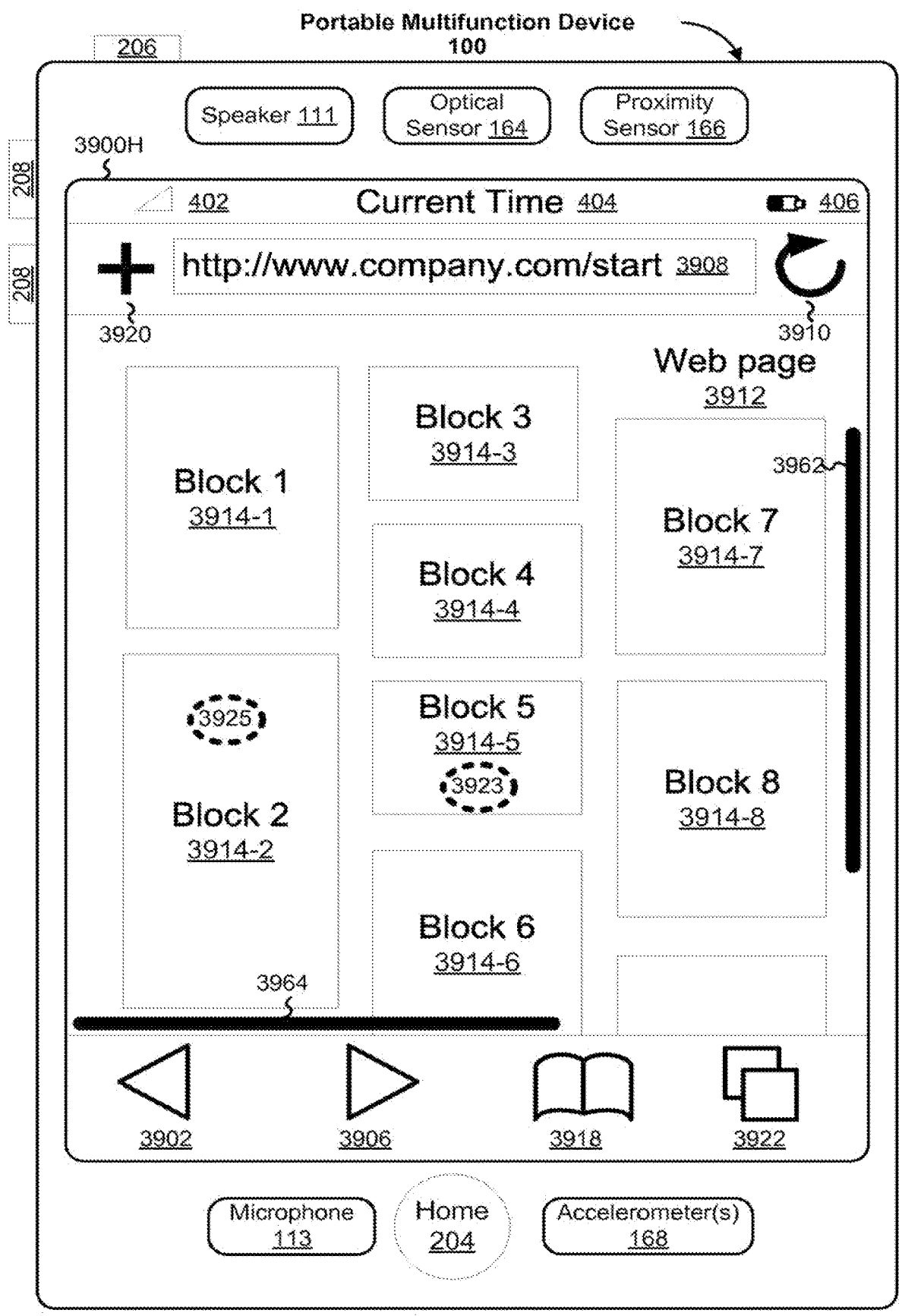
Figure 5I:
Figure 5J:
Figure 5K:
Figure 5L:
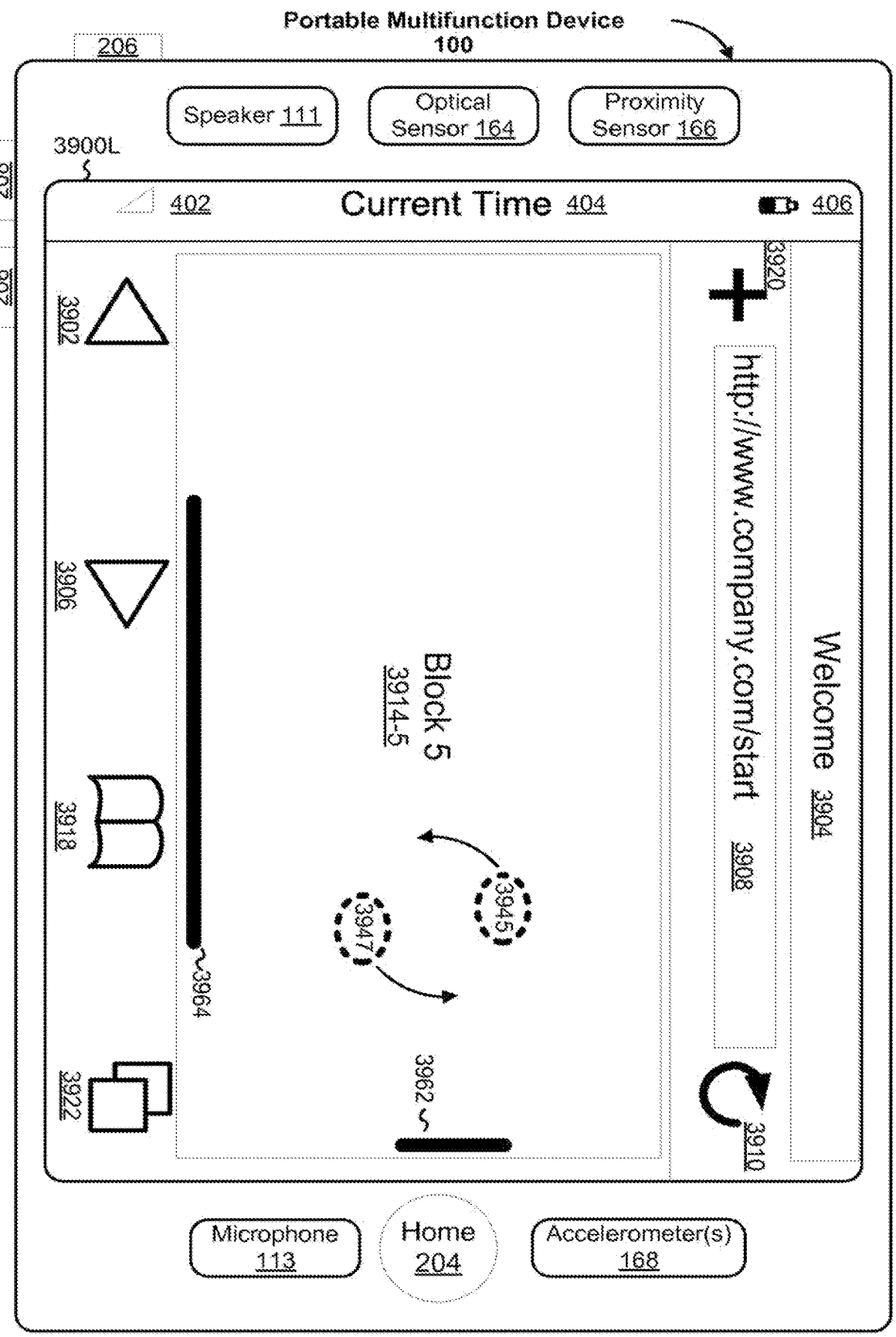
Figure 5M:
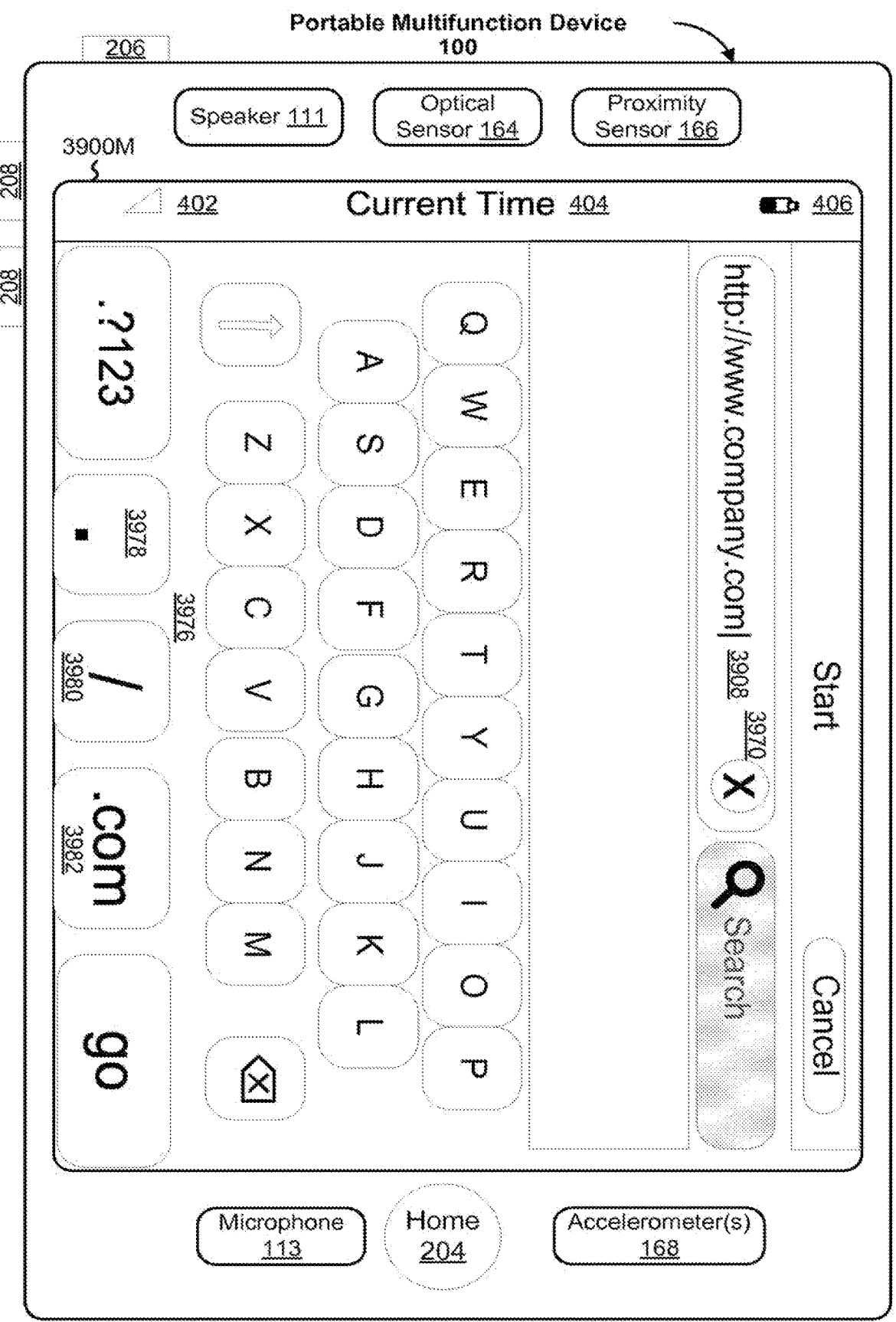

In some embodiments, user interfaces 3900A-3900M (in FIGS. 5A-5M, respectively) include the following elements, or a subset or superset thereof:
  402, 404, and 406, as described above:
  Previous page icon 3902 that when activated (e.g., by a finger tap on the icon) initiates display of the previous web page;
  Web page name 3904;
  Next page icon 3906 that when activated (e.g., by a finger tap on the icon) initiates display of the next web page;
  URL (Uniform Resource Locator) entry box 3908 for inputting URLs of web pages;
  Refresh icon 3910 that when activated (e.g., by a finger tap on the icon) initiates a refresh of the web page;
  Web page 3912 or other structured document, which is made of blocks 3914 of text content and other graphics (e.g., images and inline multimedia);

Settings icon 3916 that when activated (e.g., by a finger tap on the icon) initiates display of a settings menu for the browser;

Bookmarks icon 3918 that when activated (e.g., by a finger tap on the icon) initiates display of a bookmarks list or menu for the browser;

Add bookmark icon 3920 that when activated (e.g., by a finger tap on the icon) initiates display of a UI for adding bookmarks (e.g., UI 3900F, FIG. 5F, which like other UIs and pages, can be displayed in either portrait or landscape view);

New window icon 3922 that when activated (e.g., by a finger tap on the icon) initiates display of a UI for adding new windows to the browser (e.g., UI 3900G, FIG. 5G);

Vertical bar 3962 (FIG. 5H) for the web page 3912 or other structured document that helps a user understand what portion of the web page 3912 or other structured document is being displayed;

Horizontal bar 3964 (FIG. 5H) for the web page 3912 or other structured document that helps a user understand what portion of the web page 3912 or other structured document is being displayed;

Share icon 3966 that when activated (e.g., by a finger tap on the icon) initiates display of a UI for sharing information with other users (e.g., UI 3900K, FIG. 5K);

URL clear icon 3970 (FIG. 5I) that when activated (e.g., by a finger tap on the icon) clears any input in URL entry box 3908;

Search term entry box 3972 (FIG. 5I) for inputting search terms for web searches;

URL suggestion list 3974 that displays URLs that match the input in URL entry box 3908 (FIG. 5I), Wherein activation of a suggested URL (e.g., by a finger tap on the suggested URL) initiates retrieval of the corresponding web page;

URL input keyboard 3976 (FIGS. 5I and 5M) with period key 3978, backslash key 3980, and ".com" key 3982 that make it easier to enter common characters in URLs;

Search term clear icon 3984 that when activated (e.g., by a finger tap on the icon) clears any input in search term entry box 3972;

Email link icon 3986 (FIG. 5K) that when activated (e.g., by a finger tap or other gesture on the icon) prepares an email that contains a link to be shared with one or more other users;

Email content icon 3988 (FIG. 5K) that when activated (e.g., by a finger tap or other gesture on the icon) prepares an email that contains content to be shared with one or more other users;

IM link icon 3990 (FIG. 5K) that when activated (e.g., by a finger tap or other gesture on the icon) prepares an IM that contains a link to be shared with one or more other users; and Cancel icon 3992 (FIG. 5K) that when activated (e.g., by a finger tap or other gesture on the icon) cancels the sharing UI (e.g., UI 3900K, FIG. 5K) and displays the previous UI.

In some embodiments, in response to a predefined gesture by the user on a block 3914 (e.g., a single tap gesture or a double tap gesture), the block is enlarged and centered (or substantially centered) in the web page display. For example, in response to a single tap gesture 3923 on block 3914-5, block 3914-5 may be enlarged and centered in the display, as shown in UI 3900C, FIG. 5C. In some embodiments, the width of the block is scaled to fill the touch screen display. In some embodiments, the width of the block is scaled to fill the touch screen display with a predefined amount of padding along the sides of the display. In some embodiments, a zooming animation of the block is displayed during enlargement of the block. Similarly, in response to a single tap gesture 3925 on block 3914-2, block 3914-2 may be enlarged with a zooming animation and two-dimensionally scrolled to the center of the display (not shown).

In some embodiments, the device analyzes the render tree of the web page 3912 to determine the blocks 3914 in the web page. In some embodiments, a block 3914 corresponds to a render node that is: a replaced inline; a block; an inline block; or an inline table.

In some embodiments, in response to the same predefined gesture by the user on a block 3914 (e.g., a single tap gesture or a double tap gesture) that is already enlarged and centered, the enlargement and/or centering is substantially or completely reversed. For example, in response to a single tap gesture 3929 (FIG. 5C) on block 3914-5, the web page image may zoom out and return to UI 3900A, FIG. 5A.

In some embodiments, in response to a predefined gesture (e.g., a single tap gesture or a double tap gesture) by the user on a block 3914 that is already enlarged but not centered, the block is centered (or substantially centered) in the web page display. For example, in response to a single tap gesture 3927 (FIG. 5C) on block 3914-4, block 3914-4 may be centered (or substantially centered) in the web page display. Similarly, in response to a single tap gesture 3935 (FIG. 5C) on block 3914-6, block 3914-6 may be centered (or substantially centered) in the web page display. Thus, for a web page display that is already enlarged, in response to a predefined gesture, the device may display in an intuitive manner a series of blocks that the user wants to view. This same gesture may initiate different actions in different contexts (e.g., (1) zooming and/or enlarging in combination with scrolling when the web page is reduced in size, UI 3900A and (2) reversing the enlargement and/or centering if the block is already centered and enlarged).

In some embodiments, in response to a multi-touch 3931 and 3933 de-pinching gesture by the user (FIG. 5C), the web page may be enlarged. Conversely, in response to a multi-touch pinching gesture by the user, the web page may be reduced.

In some embodiments, in response to a substantially vertical upward (or downward) swipe gesture by the user, the web page (or, more generally, other electronic documents) may scroll one-dimensionally upward (or downward) in the vertical direction. For example, in response to an upward swipe gesture 3937 by the user that is within a predetermined angle (e.g., 27) of being perfectly vertical, the web page may scroll one-dimensionally upward in the vertical direction.

Conversely, in some embodiments, in response to a swipe gesture that is not within a predetermined angle (e.g., 27°) of being perfectly vertical, the web page may scroll two-dimensionally (i.e., with simultaneous movement in both the vertical and horizontal directions). For example, in response to an upward swipe gesture 3939 (FIG. 5C) by the user that is not within a predetermined angle (e.g., 27°) of being perfectly vertical, the web page may scroll two-dimensionally along the direction of the swipe 3939.

In some embodiments, in response to a multi-touch 3941 and 3943 rotation gesture by the user (FIG. 5C), the web page may be rotated exactly 90° (UI 3900D, FIG. 5D) for landscape viewing, even if the amount of rotation in the multi-touch 3941 and 3943 rotation gesture is substantially different from 90°. Similarly, in response to a multi-touch

3945 and 3947 rotation gesture by the user (UI 3900D, FIG. 5D), the web page may be rotated exactly 90° for portrait viewing, even if the amount of rotation in the multi-touch 3945 and 3947 rotation gesture is substantially different from 90°.

Thus, in response to imprecise gestures by the user, precise movements of graphics occur. The device behaves in the manner desired by the user despite inaccurate input by the user. Also, note that the gestures described for UI 3900C, which has a portrait view, are also applicable to UIs with a landscape view (e.g., UI 3900D, FIG. 5D) so that the user can choose whichever view the user prefers for web browsing.

Figure 6A:
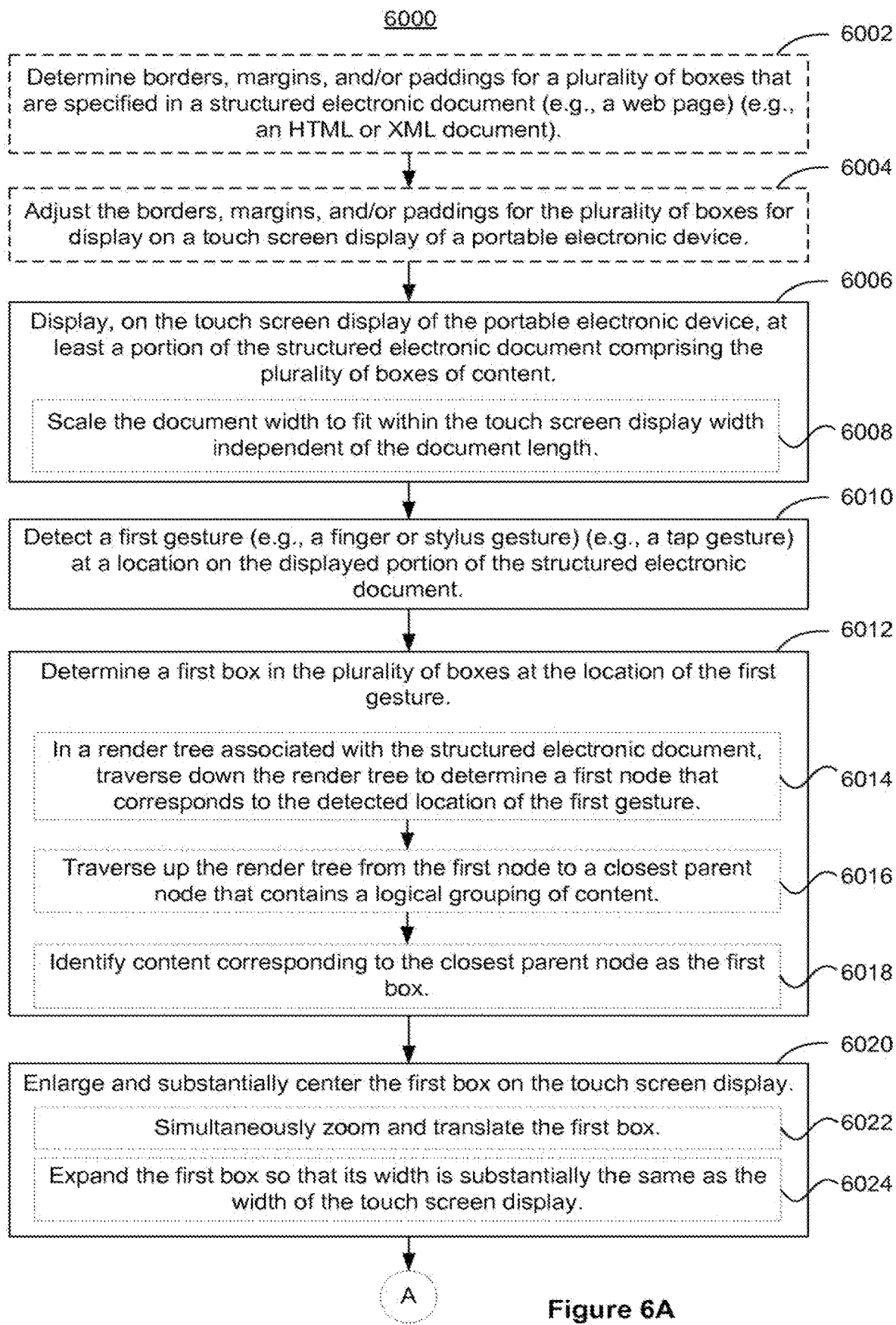
FIGS. 6A-6C are flow diagrams illustrating a process for displaying structured electronic documents such as web pages on a portable electronic device with a touch screen display in accordance with some embodiments.
Figure 6B:
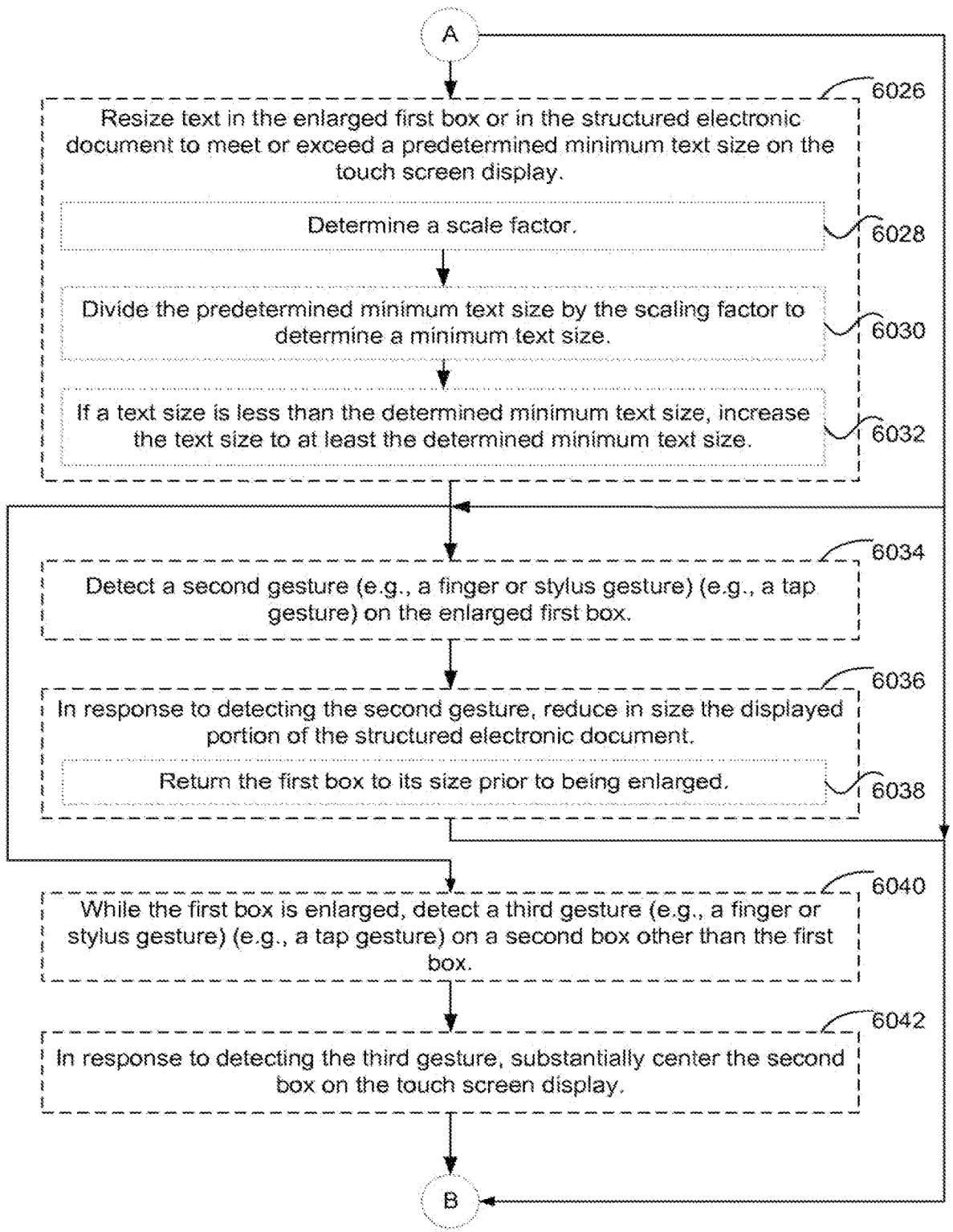
Figure 6C:
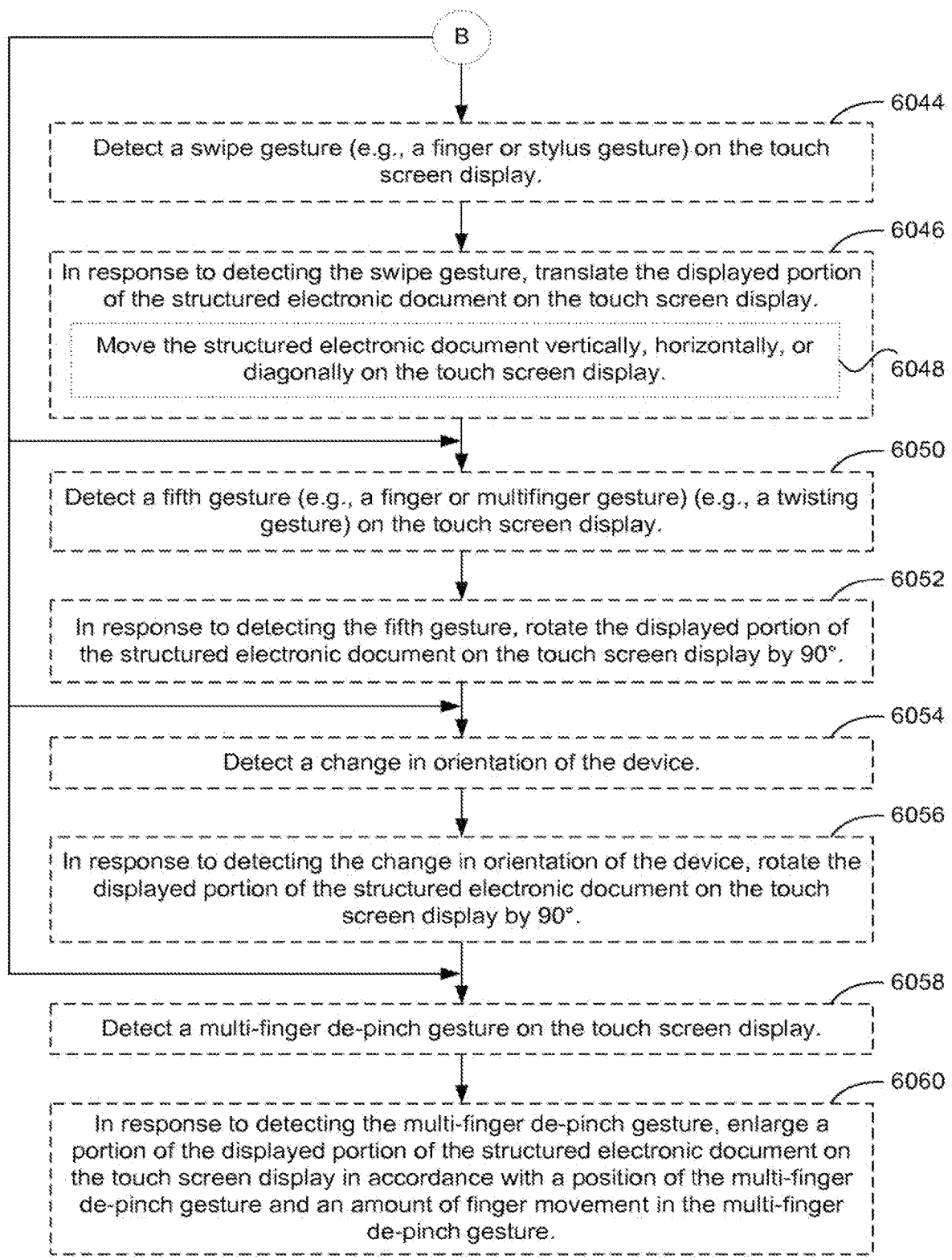

FIGS. 6A-6C are flow diagrams illustrating a process 6000 for displaying structured electronic documents such as web pages on a portable electronic device with a touch screen display (e.g., device 100) in accordance with some embodiments. The portable electronic device displays at least a portion of a structured electronic document on the touch screen display. The structured electronic document comprises a plurality of boxes of content (e.g., blocks 3914, FIG. 5A) (6006).

In some embodiments, the plurality of boxes is defined by a style sheet language. In some embodiments, the style sheet language is a cascading style sheet language. In some embodiments, the structured electronic document is a web page (e.g., web page 3912, FIG. 5A). In some embodiments, the structured electronic document is an HTML or XML document.

In some embodiments, displaying at least a portion of the structured electronic document comprises scaling the document width to fit within the touch screen display width independent of the document length (6008).

In some embodiments, the touch screen display is rectangular with a short axis and a long axis (also called the minor axis and major axis); the display width corresponds to the short axis (or minor axis) when the structured electronic document is seen in portrait view (e.g., FIG. 5C); and the display width corresponds to the long axis (or major axis) when the structured electronic document is seen in landscape view (e.g., FIG. 5D).

In some embodiments, prior to displaying at least a portion of a structured electronic document, borders, margins, and/or paddings arc determined for the plurality of boxes (6002) and adjusted for display on the touch screen display (6004). In some embodiments, all boxes in the plurality of boxes are adjusted. In some embodiments, just the first box is adjusted. In some embodiments, just the first box and boxes adjacent to the first box are adjusted.

A first gesture is detected at a location on the displayed portion of the structured electronic document (e.g., gesture 3923, FIG. 5A) (6010). In some embodiments, the first gesture is a finger gesture. In some embodiments, the first gesture is a stylus gesture.

In some embodiments, the first gesture is a tap gesture. In some embodiments, the first gesture is a double tap with a single finger, a double tap with two fingers, a single tap with a single finger, or a single tap with two fingers.

A first box (e.g., Block 5 3914-5, FIG. 5A) in the plurality of boxes is determined at the location of the first gesture (6012). In some embodiments, the structured electronic document has an associated render tree with a plurality of nodes and determining the first box at the location of the first gesture comprises: traversing down the render tree to determine a first node in the plurality of nodes that corresponds to the detected location of the first gesture (6014); traversing up the render tree from the first node to a closest parent node that contains a logical grouping of content (6016); and identifying content corresponding to the closest parent node as the first box (6018). In some embodiments, the logical grouping of content comprises a paragraph, an image, a plugin object, or a table. In some embodiments, the closest parent node is a replaced inline, a block, an inline block, or an inline table.

The first box is enlarged and substantially centered on the touch screen display (e.g., Block 5 3914-5, FIG. 5C) (6020). In some embodiments, enlarging and substantially centering comprises simultaneously zooming and translating the first box on the touch screen display (6022). In some embodiments, enlarging comprises expanding the first box so that the width of the first box is substantially the same as the width of the touch screen display (6024).

In some embodiments, text in the enlarged first box is resized to meet or exceed a predetermined minimum text size on the touch screen display (6026). In some embodiments, the text resizing comprises: determining a scale factor by which the first box will be enlarged (6028); dividing the predetermined minimum text size on the touch screen display by the scaling factor to determine a minimum text size for text in the first box (6030); and if a text size for text in the first box is less than the determined minimum text size, increasing the text size for text in the first box to at least the determined minimum text size (6032). In some embodiments, the first box has a width; the display has a display width; and the scale factor is the display width divided by the width of the first box prior to enlarging. In some embodiments, the resizing occurs during the enlarging. In some embodiments, the resizing occurs after the enlarging.

For example, suppose the predetermined minimum text size is an 18-point font and the scale factor is determined to be two. In that case, the minimum text size for text in the first box is 18 divided by 2, or 9. If text in the first box is in a 10-point font, its text size is not increased, because 10 is greater than the 9-point minimum. Once the scale factor is applied, the text will be displayed in a 20-point font, which is greater than the predetermined minimum text size of 18. If, however, text in the first box is in an 8-point font, application of the scale factor would cause the text to be displayed in a 16-point font, which is less than the predetermined minimum text size of 18. Therefore, since 8 is less than 9, the text size is increased to at least a 9-point font and displayed in at least an 18-point font after application of the scale factor.

In some embodiments, text in the structured electronic document is resized to meet or exceed a predetermined minimum text size on the touch screen display (6026; FIG. 6B). In some embodiments, the text resizing comprises: determining a scale factor by which the first box will be enlarged (6028); dividing the predetermined minimum text size on the touch screen display by the scaling factor to determine a minimum text size for text in the structured electronic document (6030); and if a text size for text in the structured electronic document is less than the determined minimum text size, increasing the text size for text in the structured electronic document to at least the determined minimum text size (6032). In some embodiments, the text resizing comprises: identifying boxes containing text in the plurality of boxes; determining a scale factor by which the first box will be enlarged; dividing the predetermined minimum text size on the touch screen display by the scaling factor to determine a minimum text size for text in the structured electronic document; and for each identified box containing text, if a text size for text in the identified box is less than the determined minimum text size, increasing the text size for text in the identified box to at least the determined minimum text size and adjusting the size of the identified box to accommodate the resized text.

In some embodiments, a second gesture (e.g., gesture 3929, FIG. 5C) is detected on the enlarged first box (6034). In response to detecting the second gesture, the displayed portion of the structured electronic document is reduced in size (6036). In some embodiments, the first box returns to its size prior to being enlarged (6038).

In some embodiments, the second gesture and the first gesture are the same type of gesture. In some embodiments, the second gesture is a finger gesture. In some embodiments, the second gesture is a stylus gesture.

In some embodiments, the second gesture is a tap gesture. In some embodiments, the second gesture is a double tap with a single finger, a double tap with two fingers, a single tap with a single finger, or a single tap with two fingers.

In some embodiments, while the first box is enlarged, a third gesture (e.g., gesture 3927 or gesture 3935, FIG. 5C) is detected on a second box other than the first box (6040). In response to detecting the third gesture, the second box is substantially centered on the touch screen display (6042). In some embodiments, the third gesture and the first gesture are the same type of gesture. In some embodiments, the third gesture is a finger gesture. In some embodiments, the third gesture is a stylus gesture.

In some embodiments, the third gesture is a tap gesture. In some embodiments, the third gesture is a double tap with a single finger, a double tap with two fingers, a single tap with a single finger, or a single tap with two fingers.

In some embodiments, a swipe gesture (e.g., gesture 3937 or gesture 3939, FIG. 5C) is detected on the touch screen display (6044; FIG. 6C). In response to detecting the swipe gesture, the displayed portion of the structured electronic document is translated on the touch screen display (6046). In some embodiments, the translating comprises vertical, horizontal, or diagonal movement of the structured electronic document on the touch screen display (6048). In some embodiments, the swipe gesture is a finger gesture. In some embodiments, the swipe gesture is a stylus gesture.

In some embodiments, a fifth gesture (e.g., multi-touch gesture 3941/3943, FIG. 5C) is detected on the touch screen display (6050). In response to detecting the fifth gesture, the displayed portion of the structured electronic document is rotated on the touch screen display by 90° (6052). In some embodiments, the fifth gesture is a finger gesture. In some embodiments, the fifth gesture is a multifinger gesture. In some embodiments, the fifth gesture is a twisting gesture.

In some embodiments, a change in orientation of the device is detected (6054). For example, the one or more accelerometers 168 (FIGS. 1A-1B) detect a change in orientation of the device. In response to detecting the change in orientation of the device, the displayed portion of the structured electronic document is rotated on the touch screen display by 90° (6056).

In some embodiments, a multi-finger de-pinch gesture (e.g., multi-touch gesture 3931/3933, FIG. 5C) is detected on the touch screen display (6058). In response to detecting the multi-finger de-pinch gesture, a portion of the displayed portion of the structured electronic document is enlarged on the touch screen display in accordance with a position of the multi-finger de-pinch gesture and an amount of finger movement in the multi-finger de-pinch gesture (6060).

While the content display process 6000 described above includes a number of operations that appear to occur in a specific order, it should be apparent that the process 6000 can include more or fewer operations, which can be executed serially or in parallel (e.g., using parallel processors or a multi-threading environment), an order of two or more operations may be changed and/or two or more operations may be combined into a single operation.

A graphical user interface (e.g., UI 3900A, FIG. 5A) on a portable electronic device with a touch screen display comprises at least a portion of a structured electronic document (e.g., web page 3912, FIG. 5A). The structured electronic document comprises a plurality of boxes of content (e.g., blocks 3914, FIG. 5A). In response to detecting a first gesture (e.g., gesture 3923, FIG. 5A) at a location on the portion of the structured electronic document, a first box (e.g., Block 5 3914-5, FIG. 5A) in the plurality of boxes at the location of the first gesture is determined and the first box is enlarged and substantially centered on the touch screen display (e.g., Block 5 3914-5, FIG. 5C).

In some embodiments, in response to a tap or other predefined user gesture on URL entry box 3908, the touch screen displays an enlarged entry box 3926 and a keyboard 616 (e.g., UI 3900B, FIG. 5B in portrait viewing and UI 3900E, FIG. 5E in landscape viewing). In some embodiments, the touch screen also displays:

Contextual clear icon 3928 that when activated (e.g., by a finger tap on the icon) initiates deletion of all text in entry box 3926;

a search icon 3930 that when activated (e.g., by a finger tap on the icon) initiates an Internet search using the search terms input in box 3926; and Go to URL icon 3932 that when activated (e.g., by a finger tap on the icon) initiates acquisition of the web page with the URL input in box 3926;

Thus, the same entry box 3926 may be used for inputting both search terms and URLs. In some embodiments, whether or not clear icon 3928 is displayed depends on the context.

UI 3900G (FIG. 5G) is a UI for adding new windows to an application, such as the browser 147. UI 3900G displays an application (e.g., the browser 147), which includes a displayed window (e.g., web page 3912-2) and at least one hidden window (e.g., web pages 3912-1 and 3934-3 and possibly other web pages that are completely hidden off-screen). UI 3900G also displays an icon for adding windows to the application (e.g., new window or new page icon 3936). In response to detecting activation of the icon 3936 for adding windows, the browser adds a window to the application (e.g., a new window for a new web page 3912).

In response to detecting a gesture on the touch screen display, a displayed window in the application is moved off the display and a hidden window is moved onto the display. For example, in response to detecting a tap gesture 3949 on the left side of the screen, the window with web page 3912-2 is moved partially or fully off-screen to the right, the window with web page 3912-3 is moved completely off-screen, partially hidden window with web page 3912-1 is moved to the center of the display, and another completely hidden window with a web page (e.g., 3912-0) may be moved partially onto the display. Alternatively, detection of a left-to-right swipe gesture 3951 may achieve the same effect.

Conversely, in response to detecting a tap gesture 3953 on the right side of the screen, the window with web page 3912-2 is moved partially or fully off-screen to the left, the window with web page 3912-1 is moved completely off-screen, partially hidden window with web page 3912-3 is moved to the center of the display, and another completely hidden window with a web page (e.g., 3912-4) may be moved partially onto the display. Alternatively, detection of a right-to-left swipe gesture 3951 may achieve the same effect.

In some embodiments, in response to a tap or other predefined gesture on a delete icon 3934, the corresponding window 3912 is deleted. In some embodiments, in response to a tap or other predefined gesture on Done icon 3938, the window in the center of the display (e.g., 3912-2) is enlarged to fill the screen.

Additional description of adding windows to an application can be found in U.S. patent application Ser. No. 11/620,647, "Method, System, And Graphical User Interface For Viewing Multiple Application Windows," filed Jan. 5, 2007, the content of which is hereby incorporated by reference.

FIGS. 7A-7F illustrate exemplary user interfaces for playing an item of inline multimedia content in accordance with some embodiments.

In some embodiments, user interfaces 4000A-4000F (in FIGS. 7A-7F, respectively) include the following elements, or a subset or superset thereof:
- 402, 404, 406, 3902, 3906, 3910, 3912, 3918, 3920, 3922, as described above;
- inline multimedia content 4002, such as QuickTime content (4002-1), Windows Media content (4002-2), or Flash content (4002-3);
- other types of content 4004 in the structured document, such as text;
- Exit icon 4006 that when activated (e.g., by a finger tap on the icon) initiates exiting the inline multimedia content player UI (e.g., UI 4000B or 4000F) and returning to another UI (e.g., UI 4000A, FIG. 7A):
- Lapsed time 4008 that shows how much of the inline multimedia content 4002 has been played, in units of time;
- Progress bar 4010 that indicates what fraction of the inline multimedia content 4002 has been played and that may be used to help scroll through the inline multimedia content in response to a user gesture;
- Remaining time 4012 that shows how much of the inline multimedia content 4002 remains to be played, in units of time;
- Downloading icon 4014 that indicates when inline multimedia content 4002 is being downloaded or streamed to the device;
- Fast Reverse/Skip Backwards icon 4016 that when activated (e.g., by a finger tap on the icon) initiates reversing or skipping backwards through the inline multimedia content 4002;
- Play icon 4018 that when activated (e.g., by a finger tap 4026 (FIG. 7C) on the icon) initiates playing the inline multimedia content 4002, either from the beginning or from where the inline multimedia content was paused;
- Fast Forward/Skip Forward icon 4020 that initiates forwarding or skipping forwards through the inline multimedia content 4002;
- Volume adjustment slider icon 4022 that that when activated (e.g., by a finger tap on the icon) initiates adjustment of the volume of the inline multimedia content 4002; and
- Pause icon 4024 that when activated (e.g., by a finger tap on the icon) initiates pausing the inline multimedia content 4002.

Figure 8:
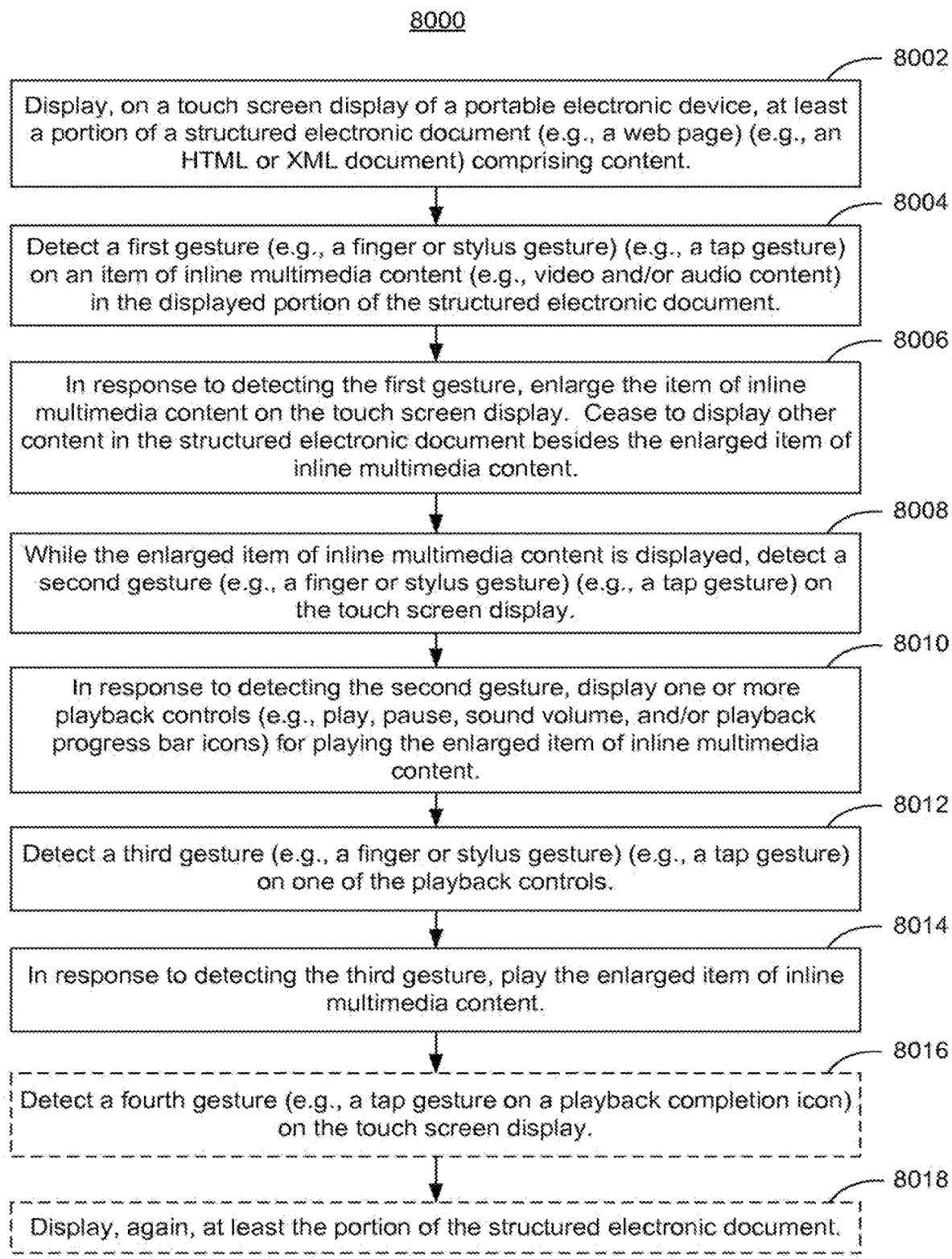
FIG. 8 is a flow diagram illustrating a process for displaying inline multimedia content on a portable electronic device with a touch screen display in accordance with some embodiments.

FIG. 8 is a flow diagram illustrating a process 8000 for displaying inline multimedia content on a portable electronic device with a touch screen display (e.g., device 100) in accordance with some embodiments. The portable electronic device displays at least a portion of a structured electronic document on the touch screen display (8002). The structured electronic document comprises content (e.g., content 4002 and 4004, FIG. 7A). In some embodiments, the structured electronic document is a web page (e.g., web page 3912). In some embodiments, the structured electronic document is an HTML or XML document.

A first gesture (e.g., gesture 4028, FIG. 7A) is detected on an item of inline multimedia content (e.g., content 4002-1, FIG. 7A) in the displayed portion of the structured electronic document (8004). In some embodiments, the inline multimedia content comprises video and/or audio content. In some embodiments, the content can be played with a QuickTime, Windows Media, or Flash plugin.

In response to detecting the first gesture, the item of inline multimedia content is enlarged on the touch screen display and other content (e.g., content 4004 and other content 4002 besides 4002-1, FIG. 7A) in the structured electronic document besides the enlarged item of inline multimedia content ceases to be displayed (e.g., UI 4000B, FIG. 7B or UI 4000F, FIG. 7F) (8006).

In some embodiments, enlarging the item of inline multimedia content comprises animated zooming in on the item. In some embodiments, enlarging the item of inline multimedia content comprises simultaneously zooming and translating the item of inline multimedia content on the touch screen display. In some embodiments, enlarging the item of inline multimedia content comprises rotating the item of inline multimedia content by 90° (e.g., from UI 4000A, FIG. 7A to UI 4000B, FIG. 7B).

In some embodiments, the item of inline multimedia content has a full size; the touch screen display has a size; and enlarging the item of inline multimedia content comprises enlarging the item of inline multimedia content to the smaller of the full size of the item and the size of the touch screen display.

Figure 7A:
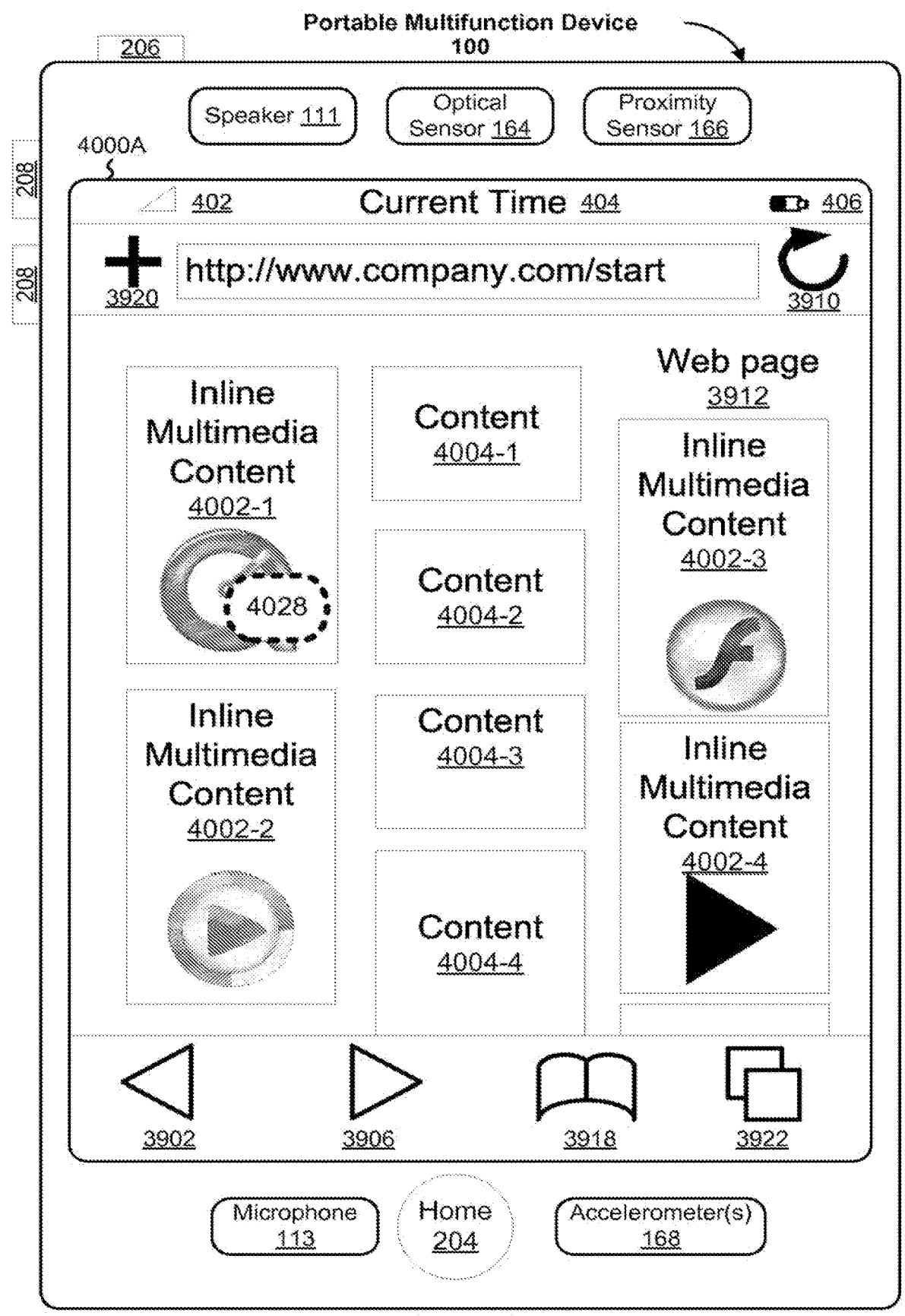
FIGS. 7A-7F illustrate exemplary user interfaces for playing an item of inline multimedia content in accordance with some embodiments.
Figure 7B:
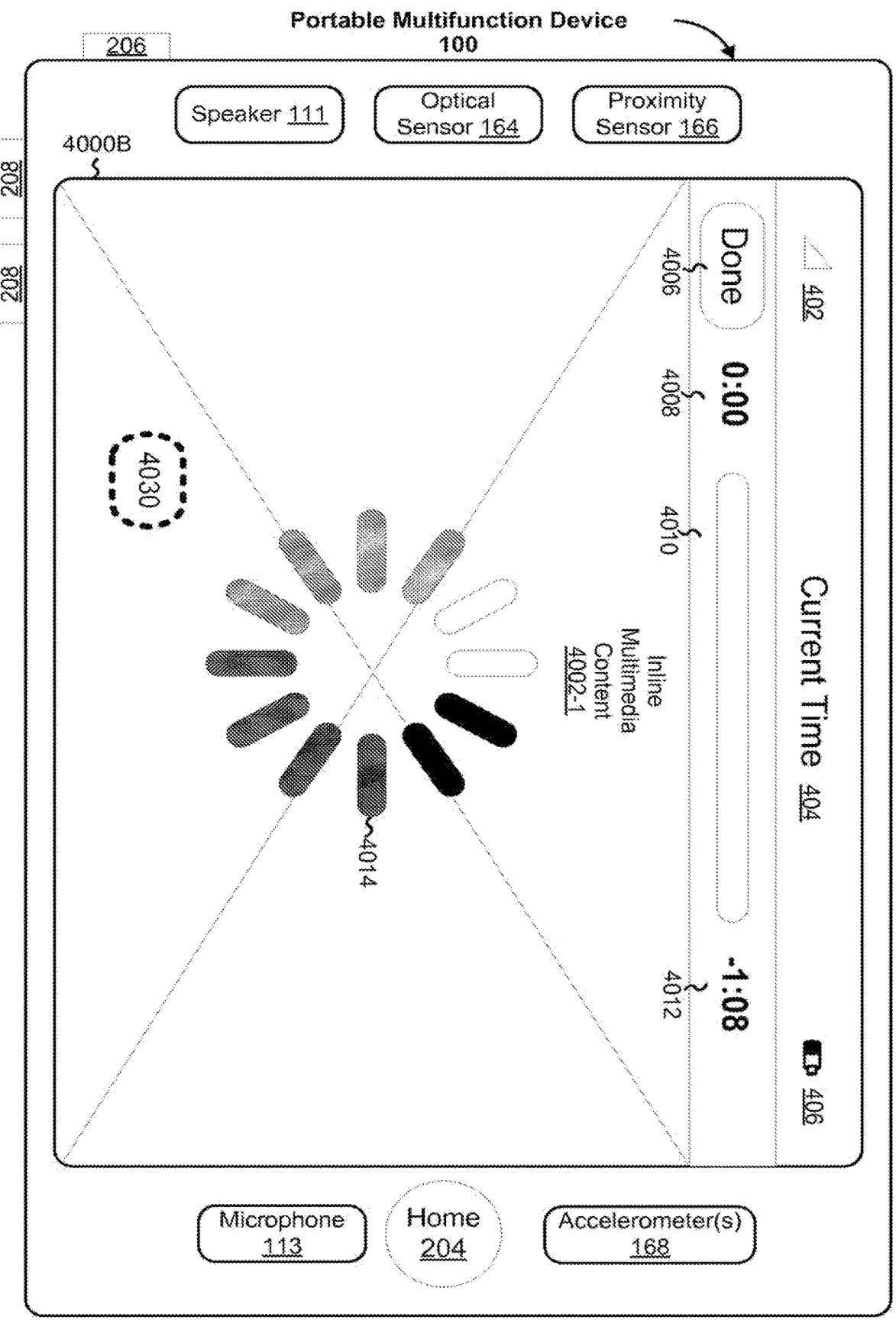
Figure 7C:
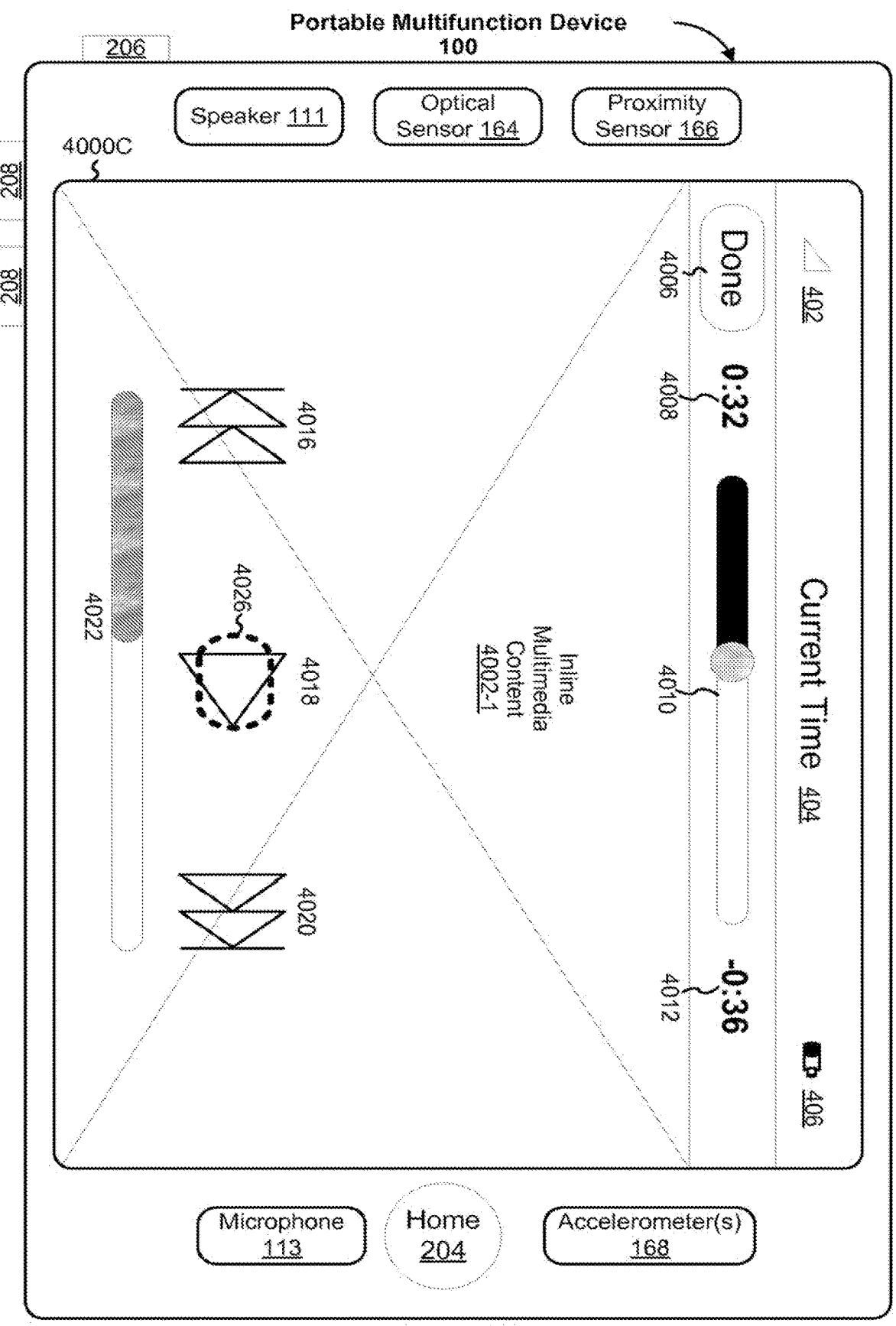
Figure 7D:
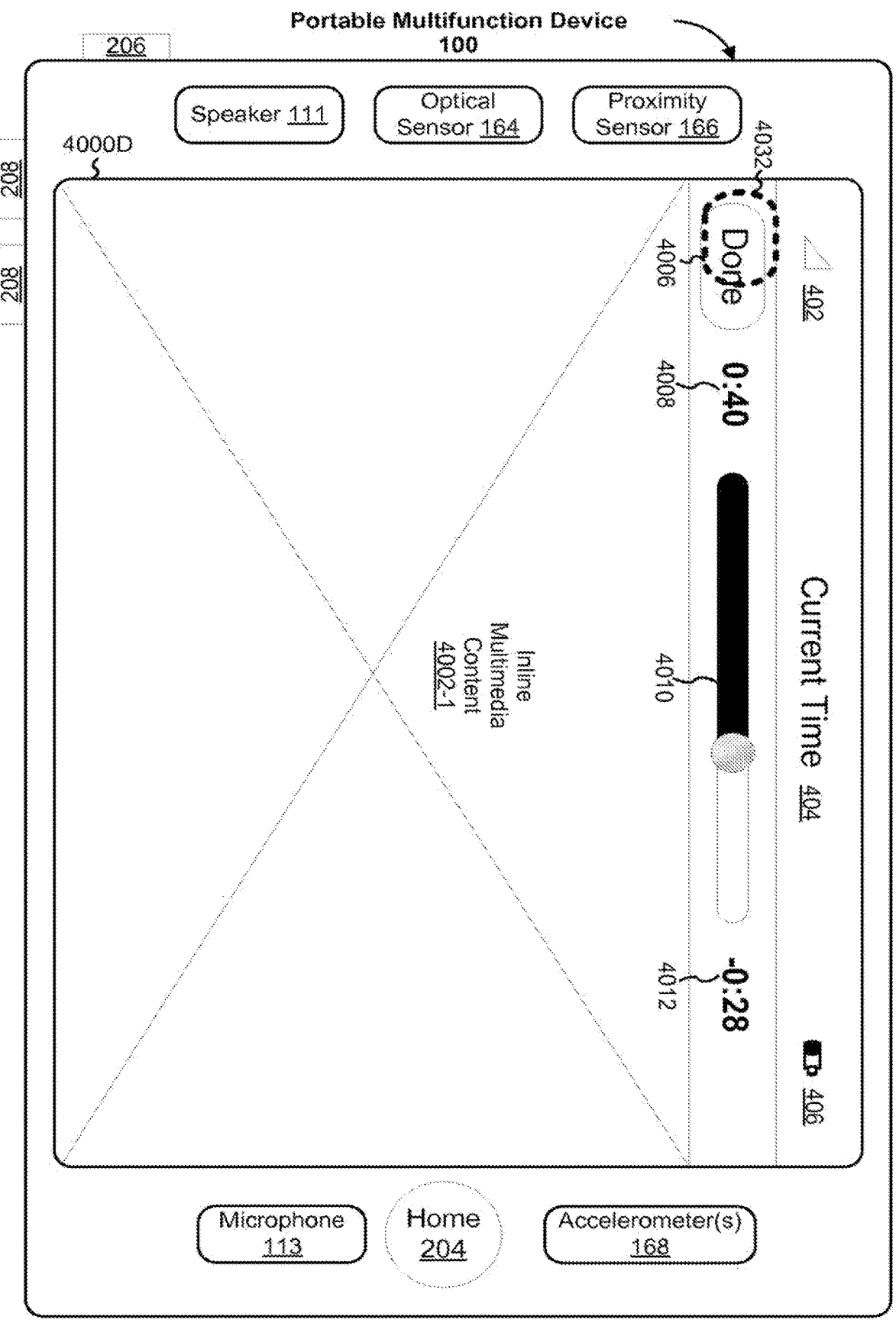
Figure 7E:
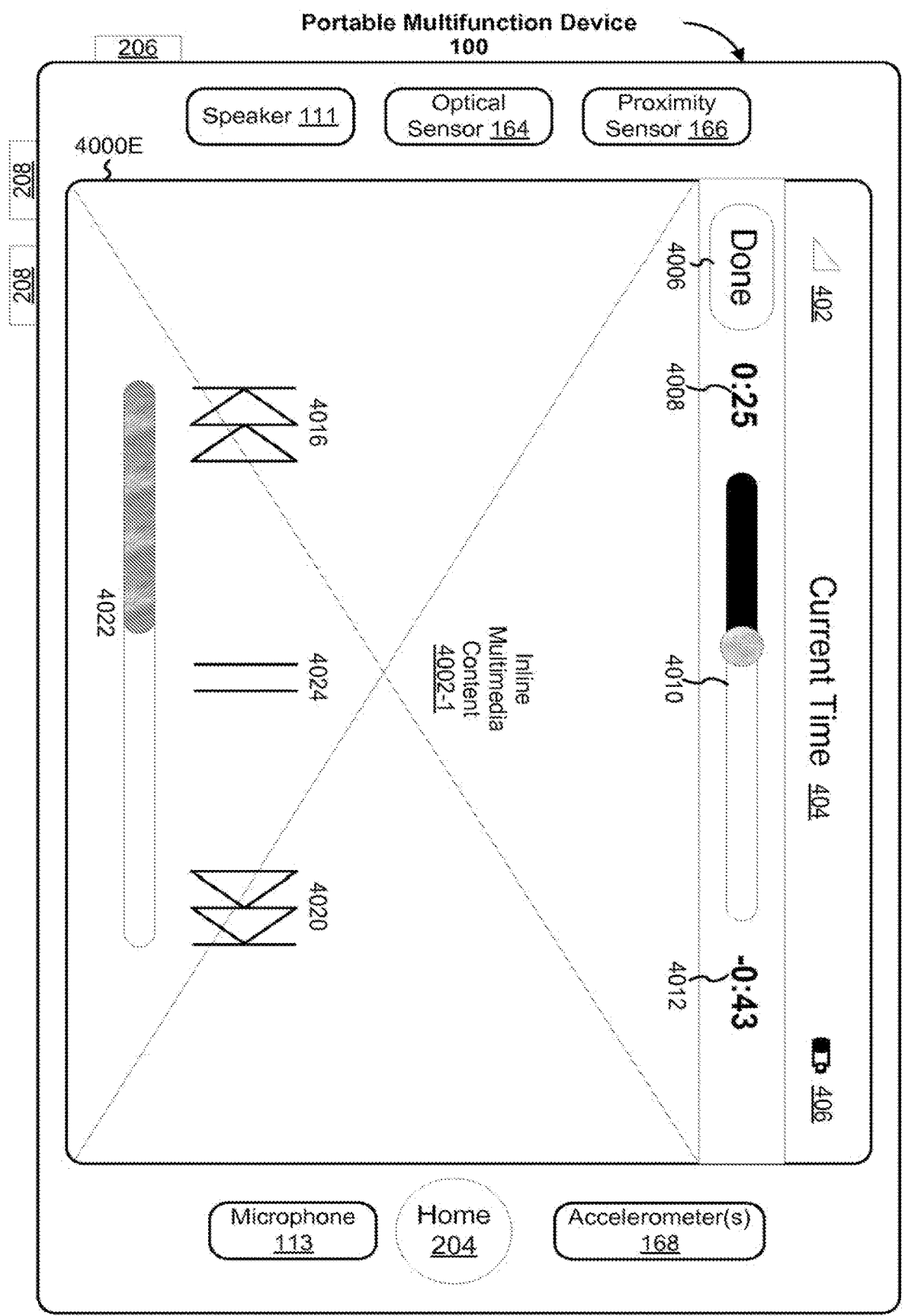
Figure 7F:
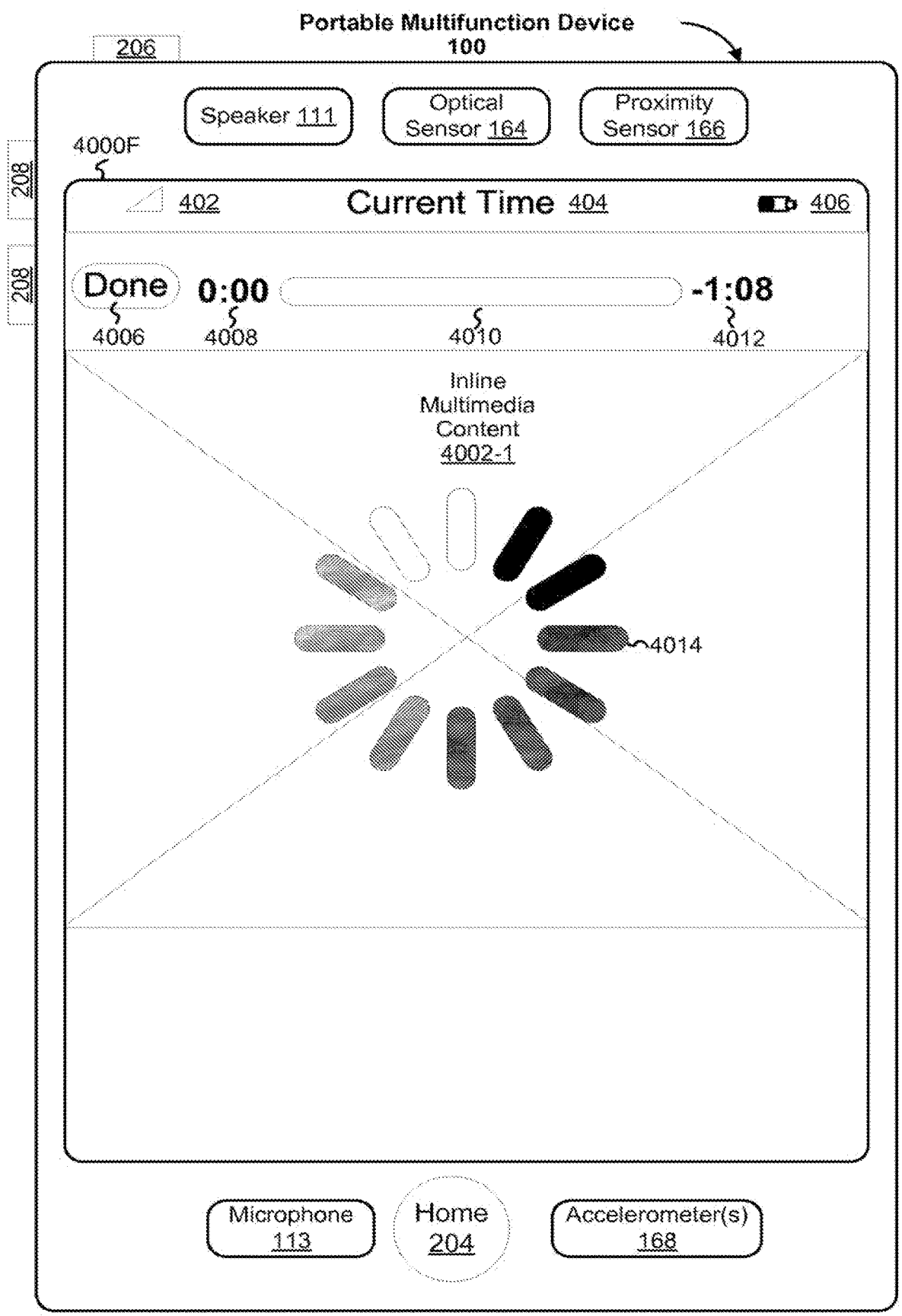

In some embodiments, enlarging the item of inline multimedia content comprises expanding the item of inline multimedia content so that the width of the item of inline multimedia content is substantially the same as the width of the touch screen display (e.g., UI 4000B, FIG. 7B or UI 4000F, FIG. 7F).

In some embodiments, ceasing to display other content in the structured electronic document besides the item of inline multimedia content comprises fading out the other content in the structured electronic document besides the item of inline multimedia content.

While the enlarged item of inline multimedia content is displayed, a second gesture is detected on the touch screen display (e.g., gesture 4030, FIG. 7B) (8008).

In response to detecting the second gesture, one or more playback controls for playing the enlarged item of inline multimedia content are displayed (8010). In some embodiments, the one or more playback controls comprise a play icon (e.g., icon 4018, FIG. 7C), a pause icon (e.g., icon 4024, FIG. 7E), a sound volume icon (e.g., icon 4022), and/or a playback progress bar icon (e.g., icon 4010).

In some embodiments, displaying one or more playback controls comprises displaying one or more playback controls on top of the enlarged item of inline multimedia content (e.g., playback controls 4016, 4018, 4020, and 4022 are on top of enlarged inline multimedia content 4002-1 in FIG. 7C). In some embodiments, the one or more playback controls are superimposed on top of the enlarged item of inline multimedia content. In some embodiments, the one or more playback controls are semitransparent.

In some embodiments, an instruction in the structured electronic document to automatically start playing the item of inline multimedia content is overridden, which gives the device time to download more of the selected inline multimedia content prior to starting playback.

A third gesture is detected on one of the playback controls (e.g., gesture 4026 on play icon 4018, FIG. 7C) (8012).

In response to detecting the third gesture, the enlarged item of inline multimedia content is played (8014). In some embodiments, playing the enlarged item of inline multimedia content comprises playing the enlarged item of inline multimedia content with a plugin for a content type associated with the item of inline multimedia content.

In some embodiments, while the enlarged item of inline multimedia content is played, the one or more playback controls cease to be displayed (e.g., FIG. 7D, which no longer displays playback controls 4016, 4018, 4020, and 4022, but still shows 4006, 4008, 4010, and 4012). In some embodiments, all of the playback controls cease to be displayed. In some embodiments, ceasing to display the one or more playback controls comprises fading out the one or more playback controls. In some embodiments, the display of the one or more playback controls is ceased after a predetermined time. In some embodiments, the display of the one or more playback controls is ceased after no contact is detected with the touch screen display for a predetermined time.

In some embodiments, a fourth gesture is detected on the touch screen display (8016). In response to detecting the fourth gesture, at least the portion of the structured electronic document is displayed again (e.g., FIG. 7A) (8018). In some embodiments, the fourth gesture comprises a tap gesture on a playback completion icon, such as a done icon (e.g., gesture 4032 on done icon 4006, FIG. 7D). In some embodiments, the item of inline multimedia content returns to its size prior to being enlarged.

In some embodiments, the first, second, and third gestures are finger gestures. In some embodiments, the first, second, and third gestures are stylus gestures.

In some embodiments, the first, second, and third gestures are tap gestures. In some embodiments, the tap gesture is a double tap with a single finger, a double tap with two fingers, a single tap with a single finger, or a single tap with two fingers.

While the multimedia display process 8000 described above includes a number of operations that appear to occur in a specific order, it should be apparent that the process 8000 can include more or fewer operations, which can be executed serially or in parallel (e.g., using parallel processors or a multi-threading environment), an order of two or more operations may be changed and/or two or more operations may be combined into a single operation.

A graphical user interface on a portable electronic device with a touch screen display comprises: at least a portion of a structured electronic document, wherein the structured electronic document comprises content; an item of inline multimedia content in the portion of the structured electronic document; and one or more playback controls. In response to detecting a first gesture on the item of inline multimedia content, the item of inline multimedia content on the touch screen display is enlarged, and display of other content in the structured electronic document besides the enlarged item of inline multimedia content is ceased. In response to detecting a second gesture on the touch screen display while the enlarged item of inline multimedia content is displayed, the one or more playback controls for playing the enlarged item of in line multimedia content are displayed. In response to detecting a third gesture on one of the playback controls, the enlarged item of inline multimedia content is played.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at an electronic device with a touch screen display:
   displaying, on the touch screen display, at least a portion of a structured electronic document, wherein the structured electronic document comprises content that includes an item of inline multimedia content in the displayed portion of the structured electronic document;
   detecting a first gesture on the item of inline multimedia content in the displayed portion of the structured electronic document;
   in response to detecting the first gesture:
   enlarging the item of inline multimedia content on the touch screen display; and
   ceasing to display other content in the structured electronic document besides the enlarged item of inline multimedia content;
   while the enlarged item of inline multimedia content is displayed, detecting a second gesture that includes detecting a touch contact on the touch screen display;
   in response to detecting the second gesture, displaying one or more playback controls for playing the enlarged item of inline multimedia content that were not displayed on the touch screen display prior to detecting the touch contact on the touch screen display;
   detecting a third gesture on the one or more playback controls; and
   in response to detecting the third gesture, playing the enlarged item of inline multimedia content.

2. The method of claim 1, wherein the structured electronic document is a web page, an HTML document, or an XML document.

3. The method of claim 1, wherein the inline multimedia content comprises video content or audio content.

4. The method of claim 1, wherein the content can be played with a QuickTime plugin, a Windows Media plugin, or a Flash plugin.

5. The method of claim 1, wherein enlarging the item of inline multimedia content comprises displaying a zooming animation of the item.

6. The method of claim 1, wherein enlarging the item of inline multimedia content comprises simultaneously zooming and translating the item of inline multimedia content on the touch screen display.

7. The method of claim 1, wherein enlarging the item of inline multimedia content comprises rotating the item of inline multimedia content by 90°.

8. The method of claim 1, wherein enlarging the item of inline multimedia content comprises expanding the item of inline multimedia content such that a width of the item of inline multimedia content is the same as a width of the touch screen display.

9. The method of claim 1, wherein:
the item of inline multimedia content has a full size;
the touch screen display has a size; and
enlarging the item of inline multimedia content comprises enlarging the item of inline multimedia content to the smaller of the full size of the item and the size of the touch screen display.

10. The method of claim 1, wherein ceasing to display other content in the structured electronic document besides the item of inline multimedia content comprises fading out the other content in the structured electronic document besides the item of inline multimedia content.

11. The method of claim 1, wherein the one or more playback controls comprise a play icon, a pause icon, a sound volume icon, a playback progress bar icon, or a combination thereof.

12. The method of claim 1, wherein displaying one or more playback controls comprises displaying one or more playback controls on top of the enlarged item of inline multimedia content.

13. The method of claim 1, wherein the one or more playback controls are superimposed on top of the enlarged item of inline multimedia content.

14. The method of claim 1, wherein the one or more playback controls are semitransparent.

15. The method of claim 1, further comprising:
overriding an instruction in the structured electronic document to automatically start playing the item of inline multimedia content.

16. The method of claim 1, wherein playing the enlarged item of inline multimedia content comprises playing the enlarged item of inline multimedia content with a plugin for a content type associated with the item of inline multimedia content.

17. The method of claim 1, further comprising:
ceasing to display the one or more playback controls while the enlarged item of inline multimedia content is played.

18. The method of claim 17, wherein ceasing to display the one or more playback controls comprises fading out the one or more playback controls.

19. The method of claim 17, wherein ceasing to display the one or more playback controls comprises ceasing to display of the one or more playback controls after a predetermined time.

20. The method of claim 17, wherein ceasing to display the one or more playback controls comprising ceasing display after no contact is detected on the touch screen display for a predetermined time.

21. The method of claim 1, further comprising:
after enlarging the item of inline multimedia content on the touch screen display and ceasing to display the other content in the structured electronic document besides the enlarged item of inline multimedia content, detecting a fourth gesture on the touch screen display; and
in response to detecting the fourth gesture, displaying, on the touch screen display, at least the entire portion of the structured electronic document that was displayed before enlarging the item of inline multimedia content.

22. The method of claim 21, wherein the fourth gesture comprises a tap gesture on a playback completion icon on the touch screen display.

23. The method of claim 21, wherein displaying at least the entire portion of the structured electronic document that was displayed before enlarging the item of inline multimedia content includes returning the item of inline multimedia content to a size at which it was displayed prior to being enlarged.

24. The method of claim 1, wherein the first gesture, the second gesture, and the third gesture are finger gestures or stylus gestures.

25. The method of claim 1, wherein the first gesture, the second gesture, and the third gesture are tap gestures.

26. The method of claim 25, wherein the tap gesture is a double tap with a single finger, a double tap with two fingers, a single tap with a single finger, or a single tap with two fingers.

27. An electronic device, comprising:
a touch screen display;
one or more processors; and
memory storing one or more programs configured to be executed by the one or more processors, the one or more programs including instructions to:
display, on the touch screen display of the electronic device, at least a portion of a structured electronic document, wherein the structured electronic document comprises content that includes an item of inline multimedia content in the displayed portion of the structured electronic document;
detect a first gesture on the item of inline multimedia content in the displayed portion of the structured electronic document;
in response to detecting the first gesture:
enlarge the item of inline multimedia content on the touch screen display; and
cease to display other content in the structured electronic document besides the enlarged item of inline multimedia content;
while the enlarged item of inline multimedia content is displayed, detect a second gesture that includes detecting a touch contact on the touch screen display;
in response to detecting the second gesture, display one or more playback controls for playing the enlarged item of inline multimedia content that were not displayed on the touch screen display prior to detecting the touch contact on the touch screen display;
detect a third gesture on the one of the playback controls; and
in response to detecting the third gesture, play the enlarged item of inline multimedia content.

28. The electronic device of claim 27, wherein the structured electronic document is a web page, an HTML document, or an XML document.

29. The electronic device of claim 27, wherein the inline multimedia content comprises video content or audio content.

30. The electronic device of claim 27, wherein the content can be played with a QuickTime plugin, a Windows Media plugin, or a Flash plugin.

31. The electronic device of claim 27, wherein enlarging the item of inline multimedia content comprises displaying a zooming animation of the item.

32. The electronic device of claim 27, wherein enlarging the item of inline multimedia content comprises simultaneously zooming and translating the item of inline multimedia content on the touch screen display.

33. The electronic device of claim 27, wherein enlarging the item of inline multimedia content comprises rotating the item of inline multimedia content by 90°.

34. The electronic device of claim 27, wherein enlarging the item of inline multimedia content comprises expanding the item of inline multimedia content such that a width of the item of inline multimedia content is the same as a width of the touch screen display.

35. The electronic device of claim 27, wherein:
the item of inline multimedia content has a full size;
the touch screen display has a size; and
enlarging the item of inline multimedia content comprises enlarging the item of inline multimedia content to the smaller of the full size of the item and the size of the touch screen display.

36. The electronic device of claim 27, wherein ceasing to display other content in the structured electronic document besides the item of inline multimedia content comprises fading out the other content in the structured electronic document besides the item of inline multimedia content.

37. The electronic device of claim 27, wherein the one or more playback controls comprise a play icon, a pause icon, a sound volume icon, a playback progress bar icon, or a combination thereof.

38. The electronic device of claim 27, wherein displaying one or more playback controls comprises displaying one or more playback controls on top of the enlarged item of inline multimedia content.

39. The electronic device of claim 27, wherein the one or more playback controls are superimposed on top of the enlarged item of inline multimedia content.

40. The electronic device of claim 27, wherein the one or more playback controls are semitransparent.

41. The electronic device of claim 27, wherein the one or more programs further include instructions to:
override an instruction in the structured electronic document to automatically start playing the item of inline multimedia content.

42. The electronic device of claim 27, wherein playing the enlarged item of inline multimedia content comprises playing the enlarged item of inline multimedia content with a plugin for a content type associated with the item of inline multimedia content.

43. The electronic device of claim 27, wherein the one or more programs further include instructions to:
cease to display the one or more playback controls while the enlarged item of inline multimedia content is played.

44. The electronic device of claim 43, wherein ceasing to display the one or more playback controls comprises fading out the one or more playback controls.

45. The electronic device of claim 43, wherein ceasing to display the one or more playback controls comprises ceasing to display of the one or more playback controls after a predetermined time.

46. The electronic device of claim 43, wherein ceasing to display the one or more playback controls comprising ceasing display after no contact is detected on the touch screen display for a predetermined time.

47. The electronic device of claim 27, wherein the one or more programs further include instructions to:
after enlarging the item of inline multimedia content on the touch screen display and ceasing to display the other content in the structured electronic document besides the enlarged item of inline multimedia content, detect a fourth gesture on the touch screen display; and
in response to detecting the fourth gesture, display, on the touch screen display, at least the entire portion of the structured electronic document that was displayed before enlarging the item of inline multimedia content.

48. The electronic device of claim 47, wherein the fourth gesture comprises a tap gesture on a playback completion icon on the touch screen display.

49. The electronic device of claim 47, wherein displaying at least the entire portion of the structured electronic document that was displayed before enlarging the item of inline multimedia content includes returning the item of inline multimedia content to a size at which it was displayed prior to being enlarged.

50. The electronic device of claim 27, wherein the first gesture, the second gesture, and the third gesture are finger gestures or stylus gestures.

51. The electronic device of claim 27, wherein the first gesture, the second gesture, and the third gesture are tap gestures.

52. The electronic device of claim 51, wherein the tap gesture is a double tap with a single finger, a double tap with two fingers, a single tap with a single finger, or a single tap with two fingers.

53. A non-transitory computer readable storage medium storing one or more programs, the one or more programs comprising instructions, which when executed by an electronic device with a touch screen display, cause the electronic device to:
display, on the touch screen display of the electronic device, at least a portion of a structured electronic document, wherein the structured electronic document comprises content that includes an item of inline multimedia content in the displayed portion of the structured electronic document;
detect a first gesture on the item of inline multimedia content in the displayed portion of the structured electronic document;
in response to detecting the first gesture:
enlarge the item of inline multimedia content on the touch screen display; and
cease to display other content in the structured electronic document besides the enlarged item of inline multimedia content;
while the enlarged item of inline multimedia content is displayed, detect a second gesture that includes detecting a touch contact on the touch screen display;
in response to detecting the second gesture, display one or more playback controls for playing the enlarged item of inline multimedia content that were not displayed on the touch screen display prior to detecting the touch contact on the touch screen display;
detect a third gesture on the one of the playback controls; and
in response to detecting the third gesture, play the enlarged item of inline multimedia content.

54. The non-transitory computer readable storage medium of claim 53, wherein the structured electronic document is a web page, an HTML document, or an XML document.

55. The non-transitory computer readable storage medium of claim 53, wherein the inline multimedia content comprises video content or audio content.

56. The non-transitory computer readable storage medium of claim 53, wherein the content can be played with a QuickTime plugin, a Windows Media plugin, or a Flash plugin.

57. The non-transitory computer readable storage medium of claim 53, wherein enlarging the item of inline multimedia content comprises displaying a zooming animation of the item.

58. The non-transitory computer readable storage medium of claim 53, wherein enlarging the item of inline multimedia content comprises simultaneously zooming and translating the item of inline multimedia content on the touch screen display.

59. The non-transitory computer readable storage medium of claim 53, wherein enlarging the item of inline multimedia content comprises rotating the item of inline multimedia content by 90°.

60. The non-transitory computer readable storage medium of claim 53, wherein enlarging the item of inline multimedia content comprises expanding the item of inline multimedia content such that a width of the item of inline multimedia content is the same as a width of the touch screen display.

61. The non-transitory computer readable storage medium of claim 53, wherein:
  the item of inline multimedia content has a full size;
  the touch screen display has a size; and
  enlarging the item of inline multimedia content comprises enlarging the item of inline multimedia content to the smaller of the full size of the item and the size of the touch screen display.

62. The non-transitory computer readable storage medium of claim 53, wherein ceasing to display other content in the structured electronic document besides the item of inline multimedia content comprises fading out the other content in the structured electronic document besides the item of inline multimedia content.

63. The non-transitory computer readable storage medium of claim 53, wherein the one or more playback controls comprise a play icon, a pause icon, a sound volume icon, a playback progress bar icon, or a combination thereof.

64. The non-transitory computer readable storage medium of claim 53, wherein displaying one or more playback controls comprises displaying one or more playback controls on top of the enlarged item of inline multimedia content.

65. The non-transitory computer readable storage medium of claim 53, wherein the one or more playback controls are superimposed on top of the enlarged item of inline multimedia content.

66. The non-transitory computer readable storage medium of claim 53, wherein the one or more playback controls are semitransparent.

67. The non-transitory computer readable storage medium of claim 53, wherein the one or more programs comprise further instructions, which when executed by the electronic device, further cause the electronic device to:
  override an instruction in the structured electronic document to automatically start playing the item of inline multimedia content.

68. The non-transitory computer readable storage medium of claim 53, wherein playing the enlarged item of inline multimedia content comprises playing the enlarged item of inline multimedia content with a plugin for a content type associated with the item of inline multimedia content.

69. The non-transitory computer readable storage medium of claim 53, wherein the one or more programs comprise further instructions, which when executed by the electronic device, further cause the electronic device to:
  cease to display the one or more playback controls while the enlarged item of inline multimedia content is played.

70. The non-transitory computer readable storage medium of claim 69, wherein ceasing to display the one or more playback controls comprises fading out the one or more playback controls.

71. The non-transitory computer readable storage medium of claim 69, wherein ceasing to display the one or more playback controls comprises ceasing to display of the one or more playback controls after a predetermined time.

72. The non-transitory computer readable storage medium of claim 69, wherein ceasing to display the one or more playback controls comprising ceasing display after no contact is detected on the touch screen display for a predetermined time.

73. The non-transitory computer readable storage medium of claim 53, wherein the one or more programs comprise further instructions, which when executed by the electronic device, further cause the electronic device to:
  after enlarging the item of inline multimedia content on the touch screen display and ceasing to display the other content in the structured electronic document besides the enlarged item of inline multimedia content, detect a fourth gesture on the touch screen display; and
  in response to detecting the fourth gesture, display, on the touch screen display, at least the entire portion of the structured electronic document that was displayed before enlarging the item of inline multimedia content.

74. The non-transitory computer readable storage medium of claim 73, wherein the fourth gesture comprises a tap gesture on a playback completion icon on the touch screen display.

75. The non-transitory computer readable storage medium of claim 73, wherein displaying at least the entire portion of the structured electronic document that was displayed before enlarging the item of inline multimedia content includes returning the item of inline multimedia content to a size at which it was displayed prior to being enlarged.

76. The non-transitory computer readable storage medium of claim 53, wherein the first gesture, the second gesture, and the third gesture are finger gestures or stylus gestures.

77. The non-transitory computer readable storage medium of claim 53, wherein the first gesture, the second gesture, and the third gesture are tap gestures.

78. The non-transitory computer readable storage medium of claim 77, wherein the tap gesture is a double tap with a single finger, a double tap with two fingers, a single tap with a single finger, or a single tap with two fingers.

\* \* \* \* \*